Jan. 25, 1955  F. W. BRIXNER ET AL  2,700,728
AUTOMATIC SWITCH CONTROL SYSTEM FOR CLASSIFICATION YARDS
Filed Aug. 15, 1950  10 Sheets-Sheet 1

Inventors
F. W. BRIXNER AND H. J. PEARCE
By Neil D. Preston
Their Attorney

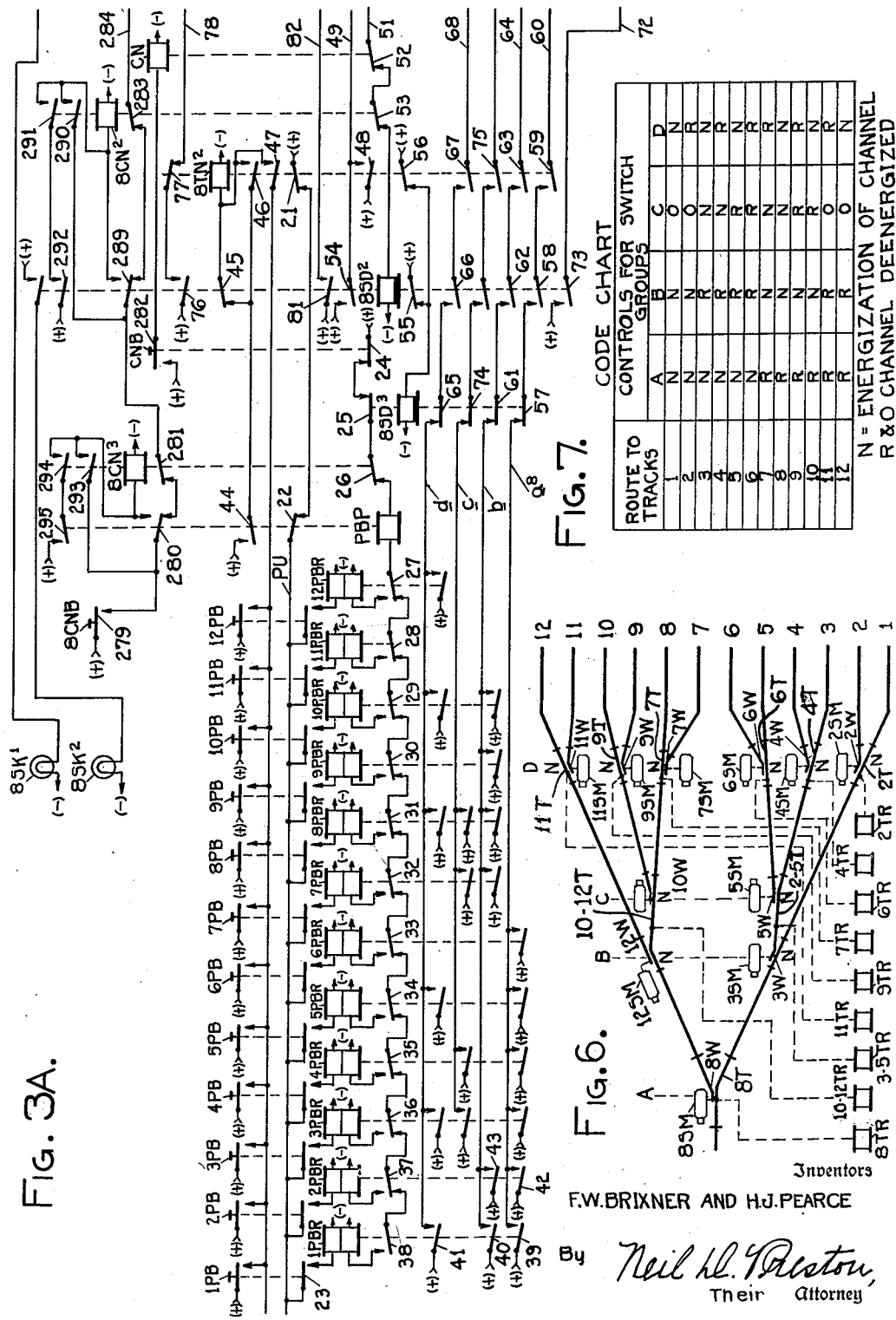

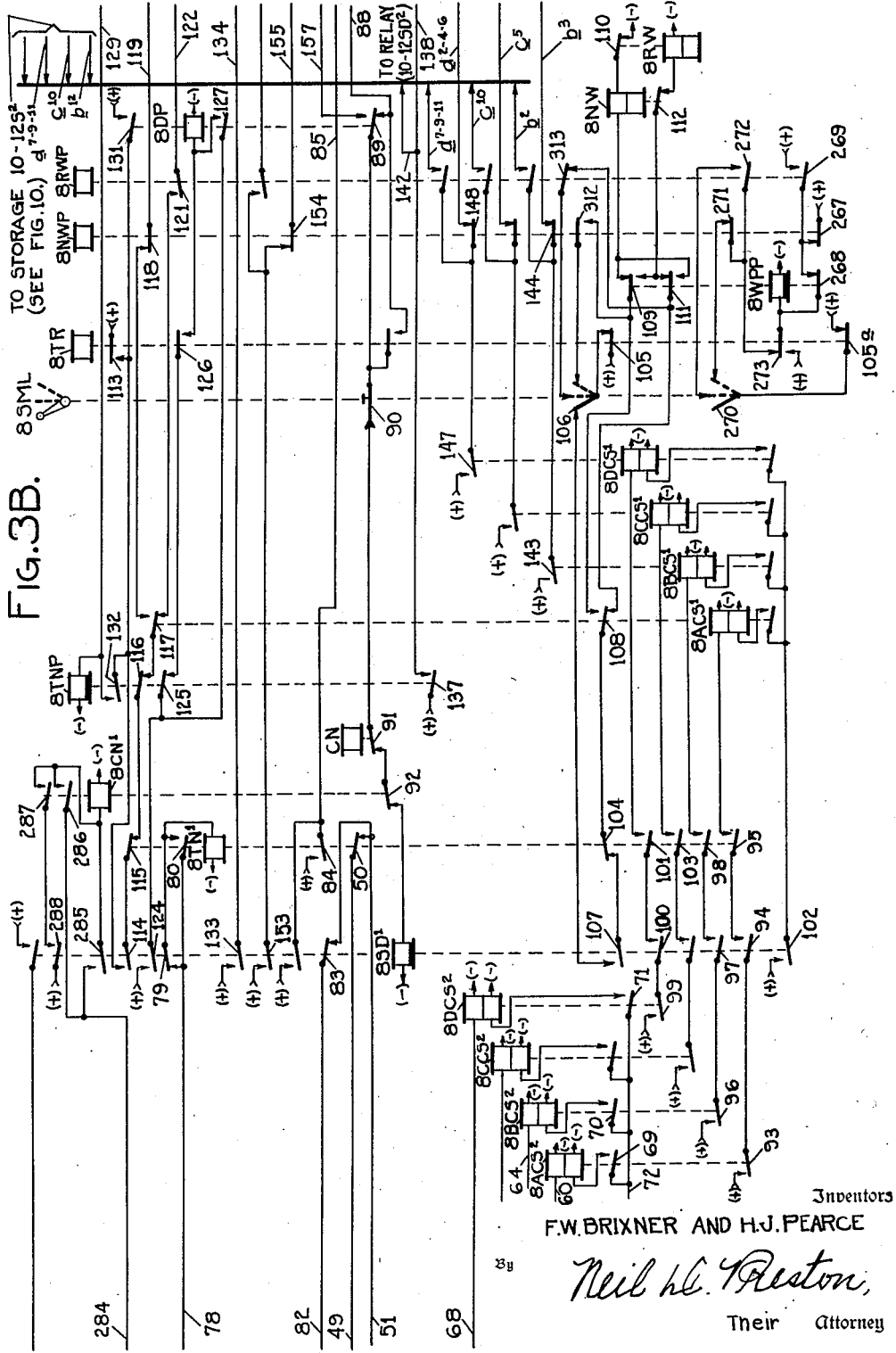

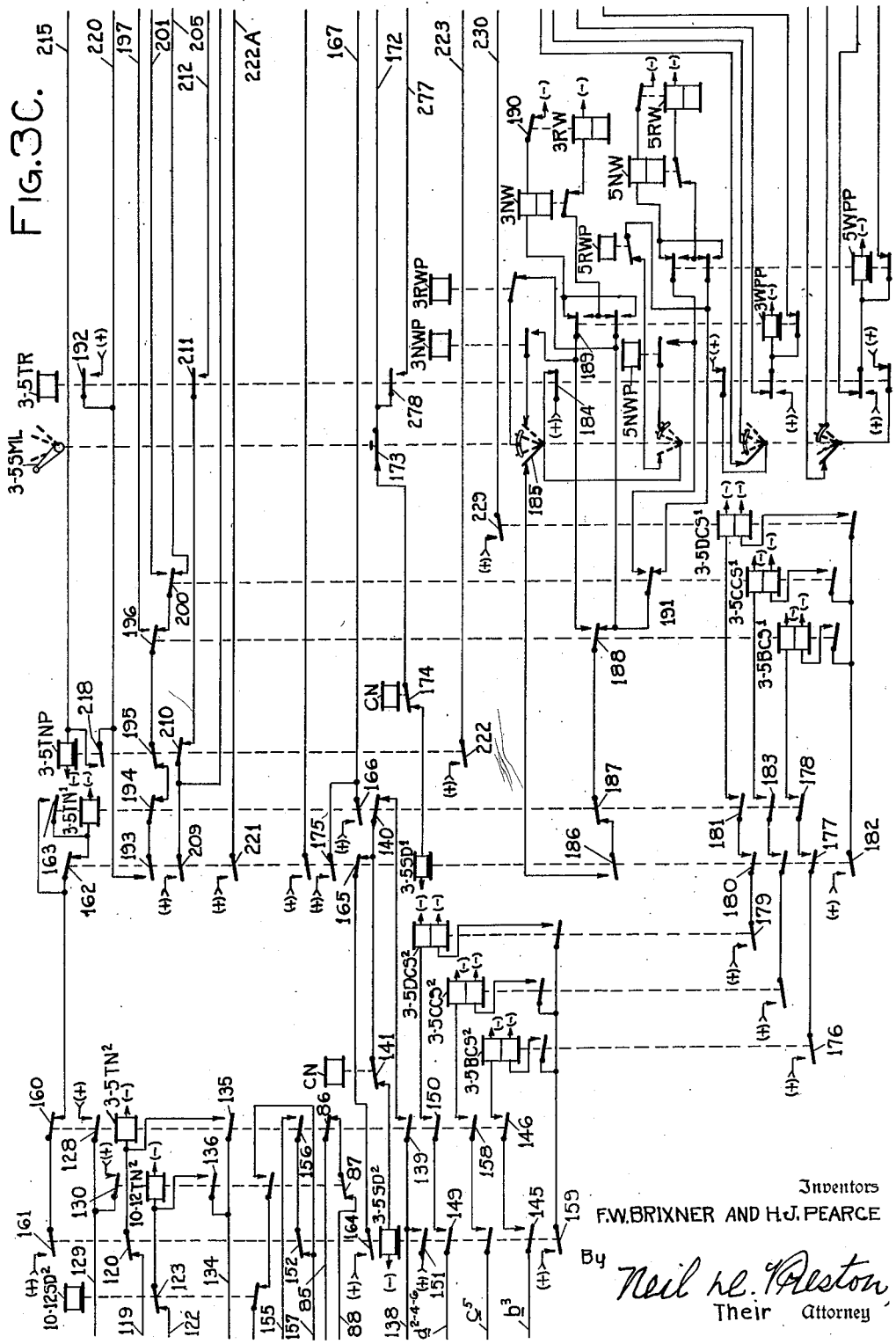

Jan. 25, 1955  F. W. BRIXNER ET AL  2,700,728
AUTOMATIC SWITCH CONTROL SYSTEM FOR CLASSIFICATION YARDS
Filed Aug. 15, 1950  10 Sheets-Sheet 5

Inventors
F.W. BRIXNER AND H.J. PEARCE
By Neil W. Preston
Their Attorney

Inventors
F.W. BRIXNER AND H.J. PEARCE
By Neil L. Preston,
Their Attorney

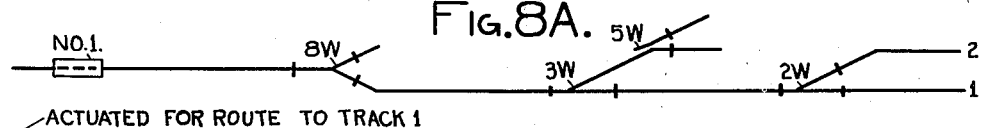

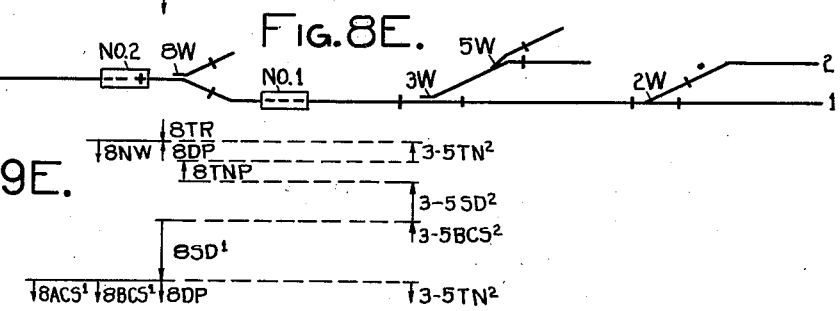
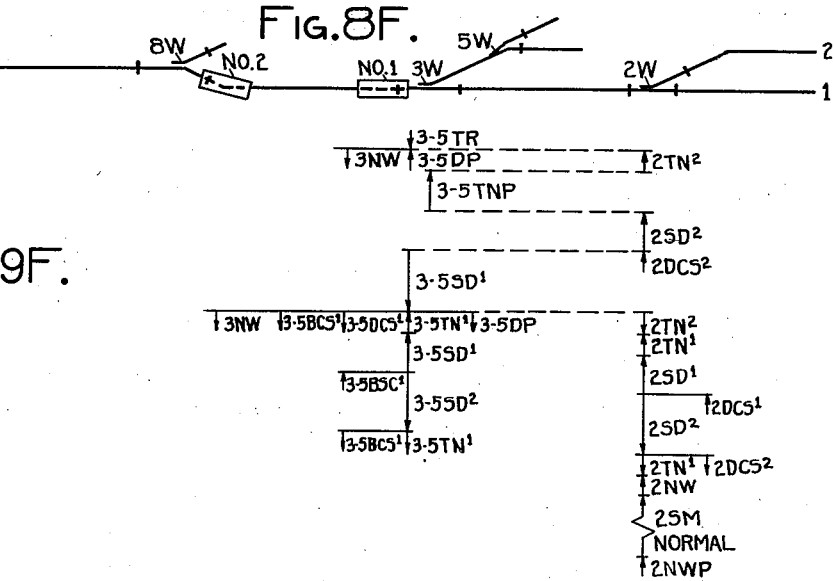
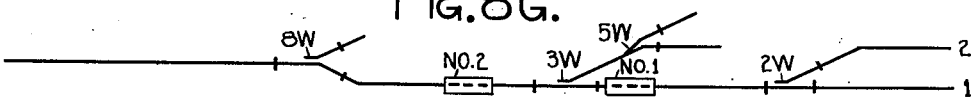
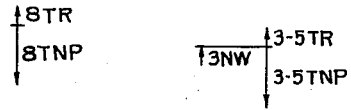

Jan. 25, 1955   F. W. BRIXNER ET AL   2,700,728
AUTOMATIC SWITCH CONTROL SYSTEM FOR CLASSIFICATION YARDS
Filed Aug. 15, 1950   10 Sheets—Sheet 9
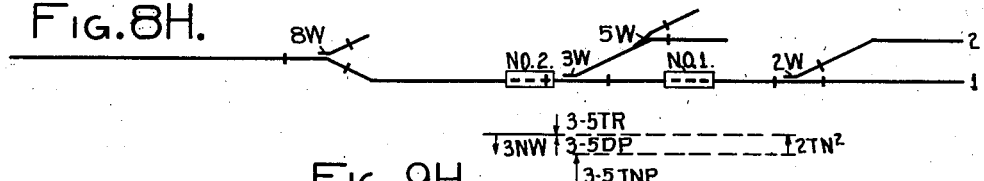
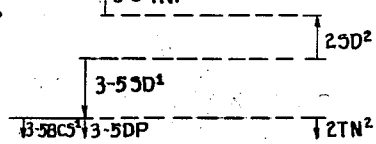
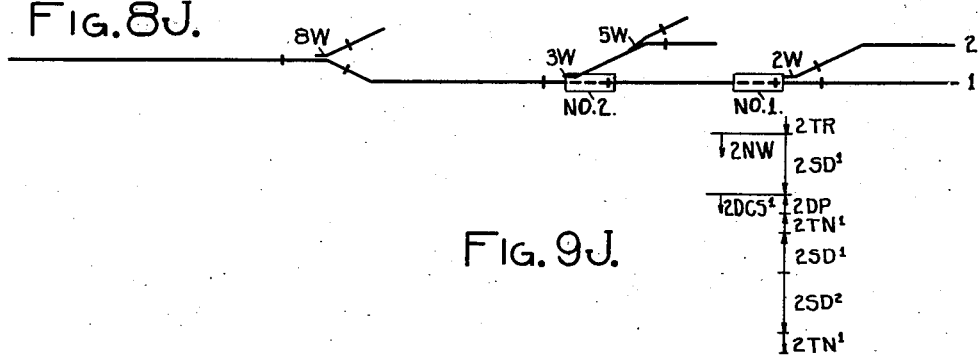
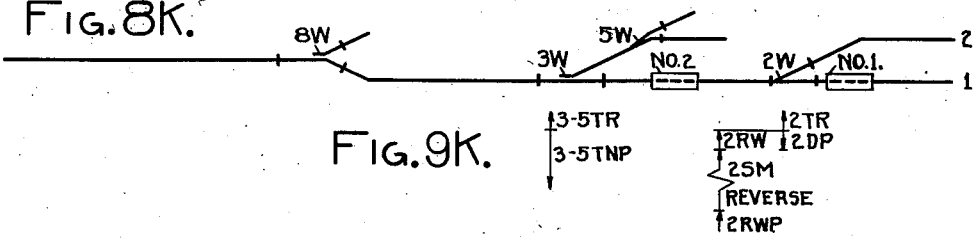
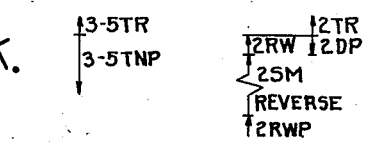
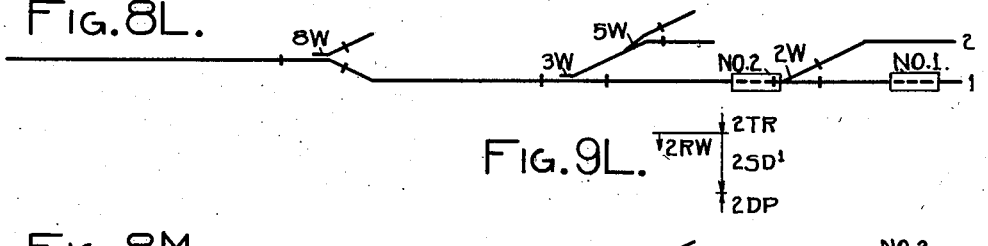
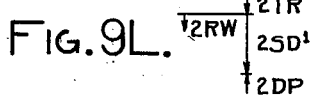
Inventors
F. W. BRIXNER AND H. J. PEARCE
By Neil H. Preston,
Their Attorney Jan. 25, 1955  F. W. BRIXNER ET AL  2,700,728
AUTOMATIC SWITCH CONTROL SYSTEM FOR CLASSIFICATION YARDS
Filed Aug. 15, 1950  10 Sheets-Sheet 10

Inventors
F.W. BRIXNER AND H.J. PEARCE

By Neil W. Preston
Their Attorney

United States Patent Office 2,700,728
Patented Jan. 25, 1955

2,700,728

AUTOMATIC SWITCH CONTROL SYSTEM FOR CLASSIFICATION YARDS

Frederick W. Brixner, Gates, and Heyward J. Pearce, Rochester, N. Y., assignors to General Railway Signal Company, Rochester, N. Y.

Application August 15, 1950, Serial No. 179,462

6 Claims. (Cl. 246—134)

This invention relates to switch control systems for classification yards, and it more particularly pertains to a switch control system in which each route is automatically selected for each car, or each cut of cars, in response to the manual designation of the track destination for that car or cut of cars.

A typical application of the present invention is for hump yards in which cars are released individually, or in cuts, from a train pushed over a hump. Inasmuch as the cars are released at close intervals so as to classify a maximum number of cuts of cars per hour, there may be several cuts of cars in progress over different routes at the same time to their respective classification tracks. The successive track switches that cars must go through are in general spaced sufficiently for two separate cuts of cars to be in progress between switches at one time, with sufficient spacing between the cuts of cars to provide time for operation of the track switches in advance before the respective cars enter the respective detector track sections. In case of lap switches, however, there is no space for cars between the switches, and a common detector track section is usually provided. It will be readily apparent that for maximum utility of the classification facilities in a yard having its respective track switches positioned by manual designation by an operator in a control tower, the operator must actuate the respective switch control levers at respective opportune moments when the cuts of cars are operating close together so as to position the track switches before the associated detector track section becomes occupied.

An object of the present invention is to set up a group of control channels, or wires, comprising a control wire for each switch of the maximum number of track switches a car may pass through successively in reaching its classification track, the connections of the wires being routed circuitwise for the control of associated switch control relays comparable to each desired route for passage of a car for which a classification track designation has been made. Because there can be two cuts of cars classified differently between successive switches (except for the lap switches) there are two banks of storage relays provided for each switch, or group of lap switches, one storage relay in each group being provided for storing the position required for each successive track switch from that point in a possible route having the greatest number of switches, and being governed by a channel wire for that switch location from the above mentioned group of control wires.

Another object of the present invention is to cause the storage of switch positions for the route of a cut of cars to be transmitted to storage groups associated with another switch in advance each time that a car for which the route is stored enters a detector track section, thus the route storage is always carried in the circuits from one storage bank to another along circuit branches in a circuit network comparable to and at a rate governed by the passage of the cars for the associated routes through the respective detector track sections.

Because of the large number of cars handled, the cuts of cars are released with a minimum separation time between them, and therefore it often occurs (where one cut of cars may be loaded heavier than another or for other reasons) that one cut of cars catches up to another cut of cars in route enough to enter a detector track section before the first cut of cars has vacated that track section, thus preventing the power operation of the track switch in correspondence with the route storage for the second cut of cars. In accordance with this mode of operation, the second cut of cars may be sent over a wrong route out of correspondence with the route that has been designated for such cars. If the route storage for that cut of cars were permitted to remain set up in the storage relay banks, it would provide erroneous control for subsequent cuts of cars by throwing them out of step with their associated designated route storages. It is therefore desirable in case a cut of cars goes through a switch in a position contrary to the positions called for by the associated route storage, that the route storage for that cut of cars be cancelled.

Another object of the present invention is to permit the transmission of route controls stored in association with one track switch to storage units associated with the next track switch along the route, only if such one track switch is operated into correspondence with its position called for for that route.

Another object of the present invention is to automatically cancel an entire route storage at any time when the cut of cars for which that route is provided is routed through a track switch which is out of correspondence with the route called for.

Another object of the present invention is to provide for manual designation of control for the respective track switches cooperating with the automatic switch control so as to cause the automatic control to be effective for the respective switches of each route, only insofar as the respective switches are operated in correspondence, and out of correspondence condition being effective to automatically cancel route storage irrespective of whether that out of correspondence condition has been caused by manual actuation of a control lever for that track switch, or because the track switch didn't have time to be operated because of the cuts of cars running on too close headway, or because of the track switch being obstructed to prevent its operation.

Another object of the present invention is to provide for cancellation of the route storages individually, or for all routes at once.

Other objects, purposes and characteristic features of the present invention will be in part obvious from the accompanying drawings, and in part pointed out as the description of the invention progresses.

In describing the invention in detail, reference is made to the accompanying drawings in which similar reference characters are used to designate corresponding or associated parts; and in which.

Figure 2:
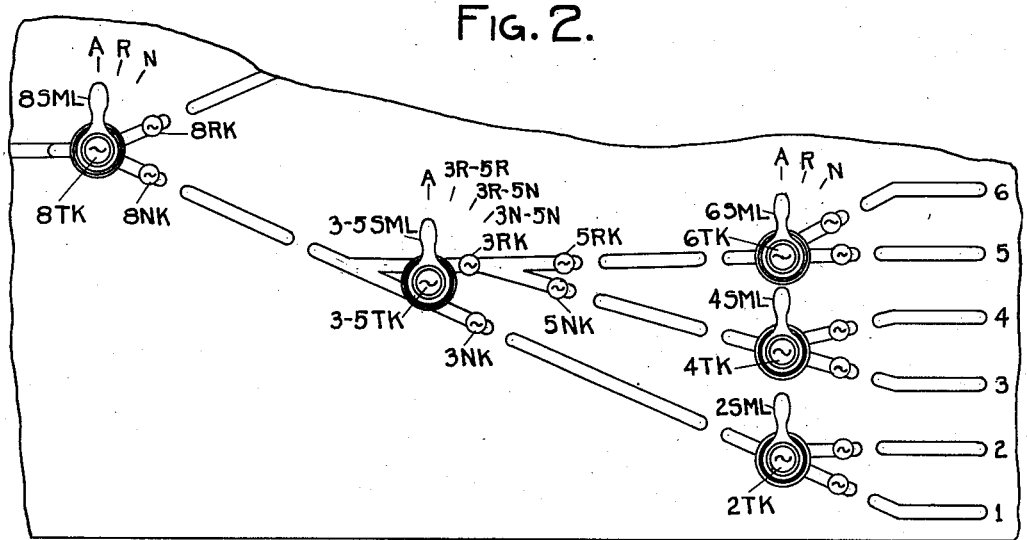
Fig. 2 is a plan view of a portion of a control panel having manually operable levers for the respective track switches and indicator lamps associated therewith for manipulation by a control tower operator.
Figure 4A:
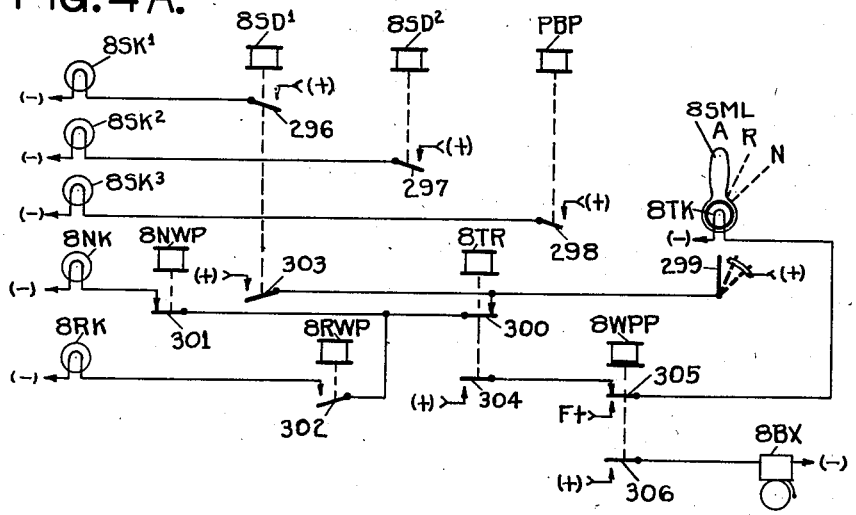
Figure 4B:
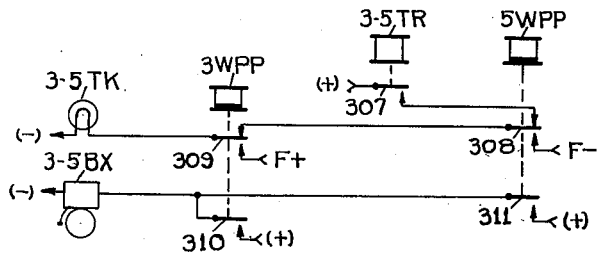
Figure 5:
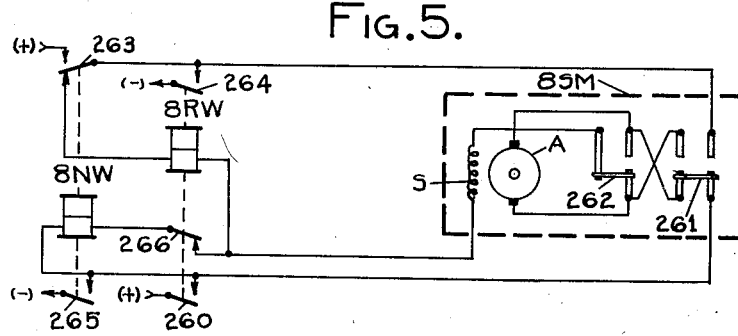
Figure 10:
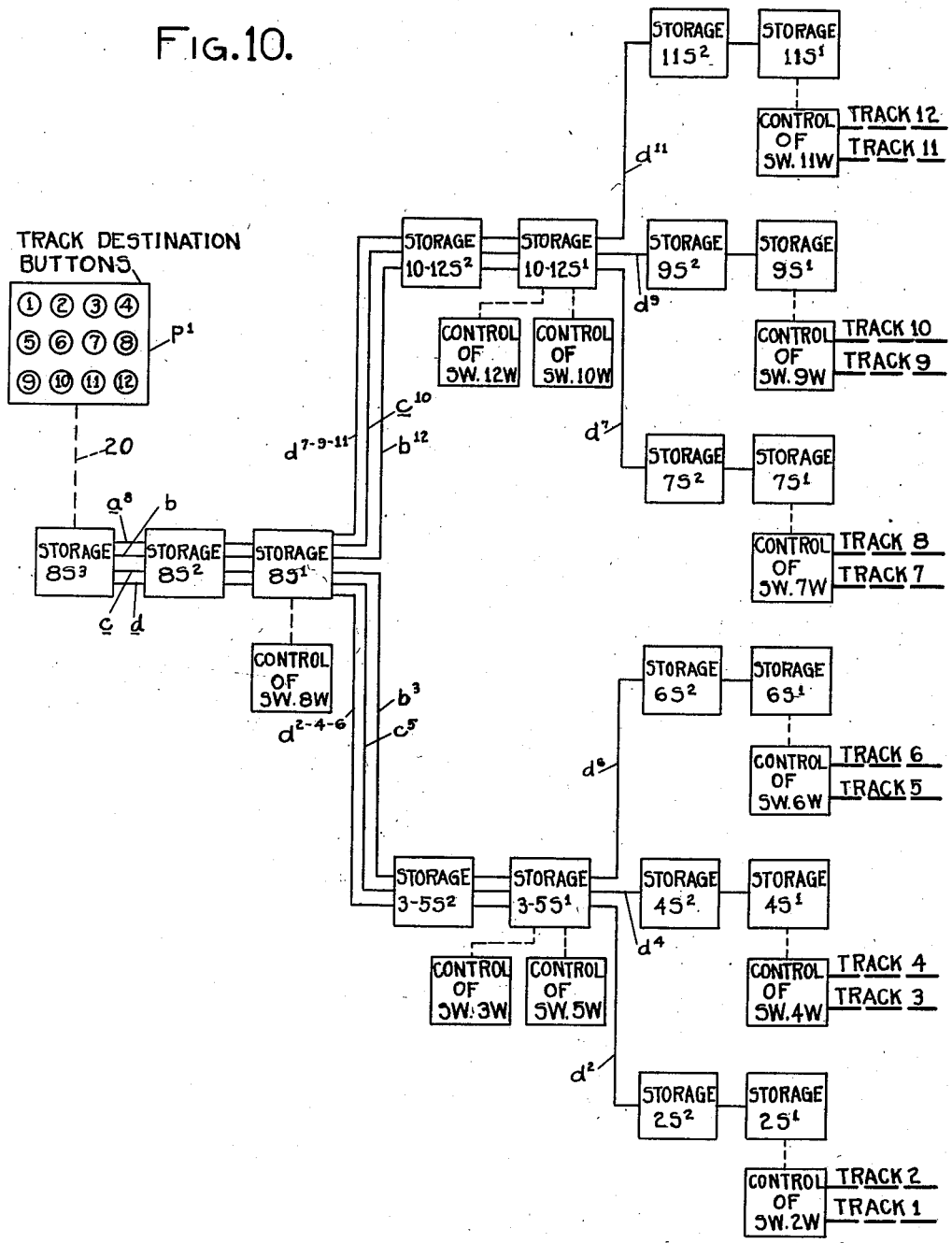

Figs. 3A to 3D inclusive, when placed side by side illustrate a circuit organization for control of the track switches for a particular typical portion of a classification yard;

Figs. 4A and 4B illustrate typical circuits for the energization of indicator lamps disposed on the panel shown in Fig. 2;

Fig. 5 illustrates the power operating circuit for a typical switch machine;

Fig. 6 is a single line track diagram of the classification yard for which this embodiment of the present invention is provided;

Fig. 7 is a code chart illustrating the condition of energization of four respective control buses in response to manual designation of respective track destinations in the classification yards illustrated in Fig. 5;

Figs. 8A to 8H and 8J to 8M inclusive illustrate by single line diagram the progress of two cars from the hump of the classification yard illustrated in Fig. 5 to the respective tracks Nos. 1 and 2;

Figs. 9A to 9H and 9J to 9M inclusive illustrate the respective sequences of operation of the relays of the system for controlling the track switches to set up routes for cars progressing through the classification yard of Fig. 5 as indicated by the diagrams of Figs. 7A to 7L respectively; and Fig. 10 illustrates by block diagram the routing of respective switch controls set up by reason of classification track designation through respective storage units.

The circuits illustrated in the drawings are prepared more particularly to facilitate an understanding of the mode of operation and the principles involved, rather than to illustrate the specific construction and arrangement of parts that would be employed in practice. The symbols (+) and (—) have been used to indicate the respective positive and negative connections to suitable batteries or other sources of direct current, and the symbol (F+) has been used to indicate connection to the positive terminal of a suitable battery or other source of direct current through a contact of a suitable circuit interrupter or flasher.

The track equipment is provided according to usual practice in classification yards of this character, the track switches being operated by suitable power switch machines, and each track switch having associated therewith a detector track section for prevention of movement of the associated track switch under a car, and for other purposes to be more readily apparent as the description progresses with respect to the transfer of route storages as the respective cuts of cars progress through the yard.

With reference to Fig. 6, the track layout for which this embodiment of the present invention is provided is illustrated as having twelve classification tracks fanning out through respective track switches between these tracks and the hump. The track switch 8W is the first switch off of the hump and is conveniently referred to as being provided at switch location A. The lap switches 3W and 5W are next to be encountered respectively upon movements through the switch 8W in its normal position, and the switches 12W and 10W are the next to be encountered by cars passing through the switch 8W in its reversed position. The track switches 5W and 10W are of course included in the route only provided that the switches 3 and 12 associated therewith are in their respective reverse and normal positions. The track switches 3W and 12W are considered as being at location B, while the switches 5W and 10W are considered as being at location C. Respective switches 2W, 4W, 6W, 7W, 9W and 11W are all located along a switch location line D. These track switches are the last to be operated for the routes that are established. From the organization of the yard as has been described, the four location reference positions A, B, C and D running transversely with respect to the yard can be considered as a means for identifying the order in which the track switches are encountered upon passage of the respective cuts of cars, and thus the order in which the track switches are operated as the cars progress through the yard.

It will be noted that the track switches of the classification yard, rather than being numbered in sequence as the track switches are encountered upon the passage of cars are numbered in a manner which, by cooperating with the normal positions of the respective track switches as shown, provides that the operation of practically any single track switch to its reversed position is effective to direct a car proceeding through that track switch to the corresponding numbered track. For example, if the track switch 8W is operated to its reverse position, with the track switches in their normal positions as shown except for the track switch 8W, a car will be routed to track 8. This condition is found to be true with respect to the passage of a train through any of the other track switches in their reverse positions. This manner of numbering of the track switches is of course chosen primarily to facilitate an understanding by the operator as to what track switches must be operated to their reverse positions for sending cars to the respective destinations under conditions where the classification of the cars is accomplished by the manual operation of switch control levers, rather than relying on the automatic operation.

Figure 1:
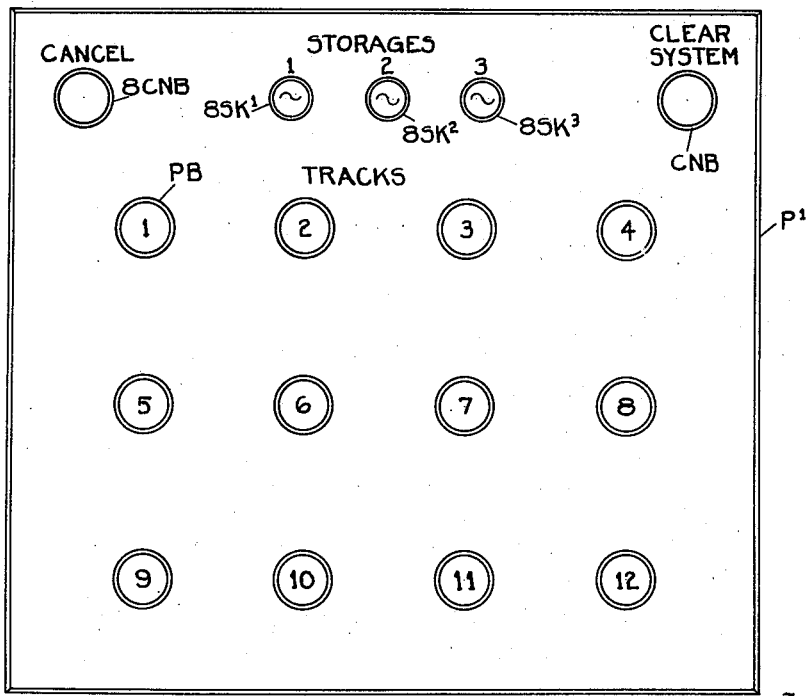
Fig. 1 is a plan view of a push button control panel having buttons disposed thereon for actuation by a hump conductor to designate the track destinations for respective cuts of cars released at the top of the hump of a classification yard.

In accordance with usual practice, the yard has a hump conductor stationed near the hump, and located at that station is a suitable control panel such as the panel P¹ illustrated in Fig. 1, having a bank of self-restoring push buttons PB disposed thereon, one push button PB being provided for each of the classification tracks of the yard.

In addition to these push buttons, a cancel push button 8CNB is provided as a means for manually designating cancellation of respective route storages associated with the control of the track switch 8W (see Fig. 6). Another cancel push button CNB is provided on the panel for cancelling out all route storages, and thus clearing the entire system. The indicator lamps 8SK¹, 8SK² and 8SK³ are provided on the hump conductors control panel P¹ as a means for illustrating which of three storage units provided in association with the first track switch of the yard (track switch 8W) is active for storing a route.

The portion of the control panel P² illustrated in Fig. 2 is indicative of a suitable means provided for selectively determining as to whether or not the control of the track switches is by manual or automatic control. This panel P² also has indicator lamps disposed thereon for indicating the positions defined by the respective route storage apparatus for the respective track switches. Thus, switch control levers 8SML, 3—5SML, 2SML, 4SML and 6SML are provided for the operation of the respective track switches 8, 3 and 5, 2, 4 and 6 respectively. These levers SML each have contained therein a suitable indicator lamp which is controlled according to circuits illustrated in Fig. 4 so as to indicate track occupancy of the associated detector track section for the associated switch, and so as to indicate by flashing energization when a track switch fails to complete its operation, such as because of an obstruction or the like.

Figure 3D:
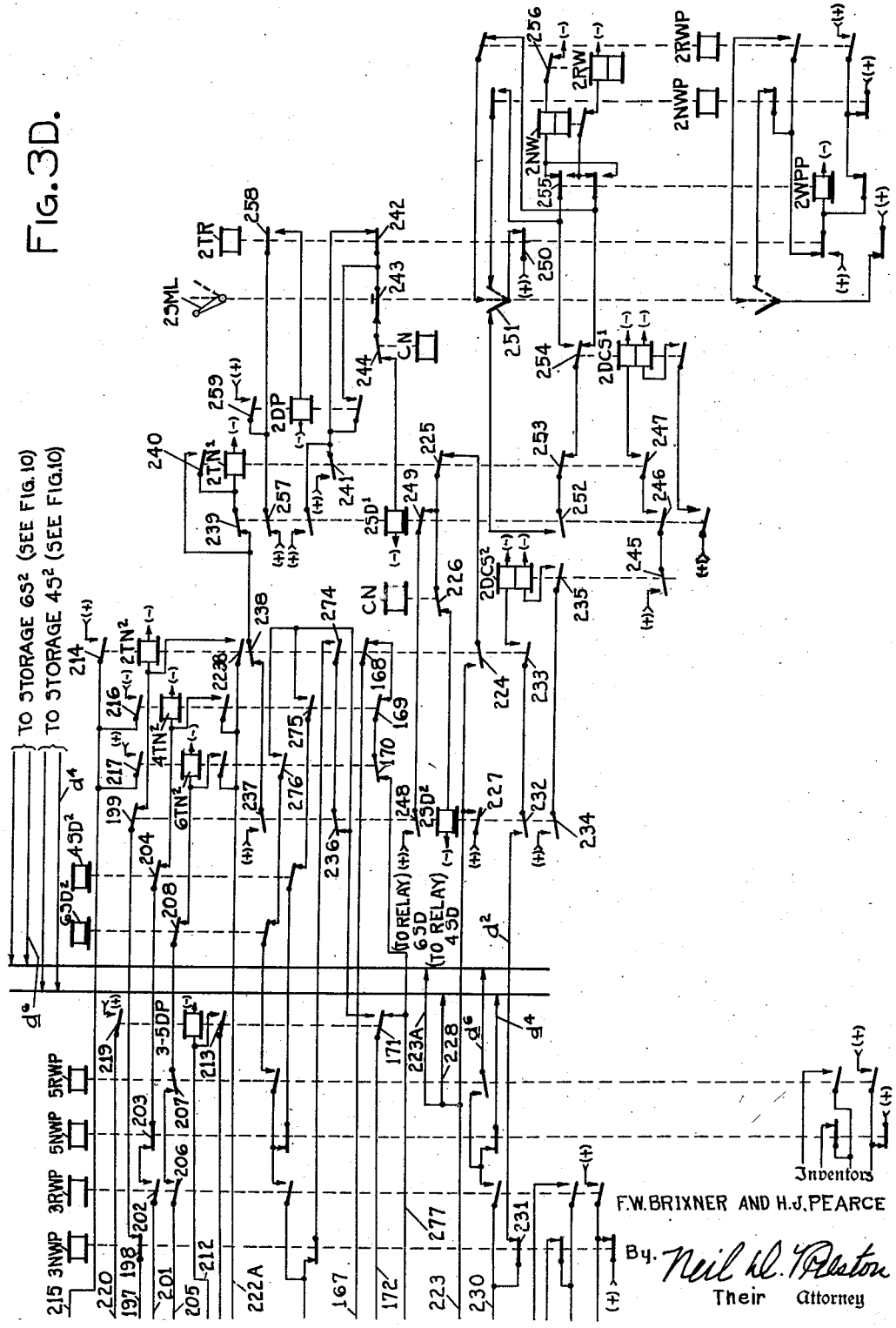

The respective switch levers SML as illustrated in Figs. 3B, 3C and 3D are of the three position type, except for the levers of the lap switches which have four positions. The lever 8SML, when in its left-hand position renders the automatic means effective for the control of the track switch 8W, when in its center position causes the operation of the track switch 8W to its reverse position, and when in its right-hand position it causes the actuation of the track switch 8W to its normal position. The four position switch control lever 3—5SML, for example, for the lap switches 3 and 5 has its extreme left-hand position used for selecting automatic control of the track switches, the next right-hand position being used for selecting the reverse position for switches 3W and 5W, the next position to the right being effective to select the reverse position for the switch 3W and the normal position of the switch 5W, and in its full right-hand operated position being effective to operate the switches 3W and 5W both to their normal positions. All of the levers SML have contacts associated therewith that can be broken by the pulling out of the associated lever against a spring bias, these contacts being used for the purpose of cancellation in a manner to be more readily apparent when the mode of operation of the system is considered more specifically.

The system control apparatus organization is illustrated by the block diagram of Fig. 10 as comprising route storage units S as being associated with the control of the respective track switches. Each of these storage units S comprises a bank of code storage relays CS (see Figs. 3A to 3D), one storage relay being provided for each track switch a car may pass through in a route from the track switch with which the storage unit is associated. Thus for the first three storage units 8S¹, 8S² and 8S³, there are four storage relays provided for each storage unit, because this is the number of track switches that may be required to operate in a route emanating from the hump. These three storages are fed in response to controls set up for the respective control wires $a^8$, $b$, $c$, $d$ in response to the actuation of the track designation buttons on the hump conductors control panel P¹. These four control wires can be considered as being associated with the respective transverse location lines A, B, C and D of the yard layout of Fig. 6. It is therefore provided that the wire $a^8$ is associated with the control of the track switch 8W, while the energization of the other three wires governs the positions of track switches of the respective groups B, C and D as a car progresses.

The storage unit 8S¹, comprising relays 8ACS¹, 8BCS¹, 8CCS¹ and 8DCS¹ (see Fig. 3B), is the bank of switch control relays from which the track switch 8W is controlled, and suitable switch control relays 8NW, 8RW, 8NWP, 8RWP and 8WPP (see Fig. 3B) are provided for more directly governing and indicating the operation of the track switch 8W in accordance with the route description stored by this storage bank 8S¹ (see Fig. 10). The storage banks 8S², comprising relays 8ACS², 8BCS², 8CCS² and 8DCS² (see Fig. 3B), and 8S³, comprising relays PBR and PBP (see Fig. 3A), are provided as a means for storing additional route descriptions which may be designated before a route description stored by the storage unit $8S^1$ is transferred in accordance with the passage of a car for which the route description of the storage $8S^1$ has been set up. It will be readily apparent that the number of storages to be provided initially is a matter of choice as to the facilities desired for setting up route designations for respective cuts of cars prior to the passage of such cars over the track switch 8W. That is, the number of route descriptions for respective cuts of cars to be stored prior to the passage of a car through the track switch 8W can be arbitrarily determined by the number of respective storage banks to be provided in accordance with the requirements of practice.

It has been pointed out that the space between successive track switches (except for lap switches) is generally such as to require two route descriptions to be provided for the approach of each successive track switch subsequent to the track switch 8W, and thus the storage relay units $3$—$5S^1$ (see Fig. 10) and $3$—$5S^2$ are provided for storing route descriptions including designations as to the positions for the lap switches 3W and 5W. Similarly the storage units $10$—$12S^1$ and $10$—$12S^2$ are provided for storing respective route descriptions including the control of the lap switches 10 and 12.

It will be noted according to Fig. 10 that there are only three control wires carrying the route descriptions to these storage units particularly associated with the control of the lap switches, because at this particular point along a route extending from the hump, the control for the track switch 8W has already been executed, and thus the switch control wire $a^8$ is no longer required, and the route description is thus carried into the next storages by three wires instead of four. The selection as to whether these three wires are directed to the storage units for one pair of lap switches or the other, is selected on the switch repeater relays 8NWP (see Fig. 3B) and 8RWP in accordance with the position to which the track switch 8W has been operated for the route involved. Thus according to the block diagram of Fig. 10, the wire $b$ is connected either to the storage for switch 3 or switch 12, dependent upon the position to which the track switch 8W has been actuated. The wire $b^3$ coming out of the storage $8S^1$ feeds the storages for the track switch 3, and the wire $b^{12}$ coming out of the storage $8S^1$ feeds the storages for the track switch 12W. These respective storage units for the lap switches are required to have only three storage relays each, one for each successive track switch to be controlled for the remainder of a route, in correspondence with the number of route description control wires feeding those storage units. The power operation of the lap switches in accordance with route description storages transferred to the associated storage units is accomplished through switch control relays comparable to those which have been described as being associated with the track switch 8W for governing its power operation.

Inasmuch as two of the switch controls for a route description are utilized by the lap switches, the next storage units are fed only by single route description control wires $d$, as only one more track switch is required to be positioned to complete the route after the positioning of the lap switches. Similarly, inasmuch as there is only one more track switch to be controlled, each of the last storage units to be employed is required to have only one control storage relay CS.

The transfer of route descriptions from the storage unit $S^1$ for the lap switches involves selection by the switch position repeater relays NWR and RWP of these lap switches so that three wires for the control of respective track switches at the D position are fed from the lap switch storages by distinctive circuit selections, the transfer being routed over but one of these three channels for any one route description. If the lap switches 3W and 5W are positioned in their normal positions, for example, the route control for switch 2W is selected, and transfer is accomplished over the wire $d^2$ to the storage units $2S^1$ and $2S^2$ which are associated with the control of the switch 2W. The switch 2W is provided with switch control and switch position indication relays comparable to those which have been described as being associated with the control of the track switch 8W.

Associated with each of the storage units S as illustrated in Fig. 10 are suitable description storage relays SD, transfer relays TN and cancel relays CN (see Figs. 3A to 3D inclusive). The description storage relays SD are made slow acting for purposes to be more readily apparent when considering the specific mode of operation of the system under typical operating conditions, and from reference to the sequence charts of Figs. 9A to 9M inclusive.

Each of the single track switches, and each pair of lap switches, has associated therewith a conventional detector track circuit, with a normally energized track relay TR associated therewith. Associated with the detector track sections, and for purposes of governing the conditions of transfer of route descriptions are suitable transfer repeater slow acting relays TNP (except for the last track switch of a route). A relay DP is provided for each track switch (or group of lap switches) for the purpose of permitting but one route description transfer to be made each time a car passes through the associated detector track section.

Having considered the general organization of apparatus provided in the switch control system for one embodiment of the present invention, more specific consideration of the system will now be given with reference to the mode of operation upon consideration of typical operating conditions.

OPERATION

Before considering specifically the respective circuits involved, a brief consideration will be given to the mode of operation of the system with reference to the block diagram of Fig. 10. As is indicated by the dotted line 20 of the block diagram, the actuation of a push button on the hump conductor's push button panel $P^1$ sets up a route description storage in the storage unit $8S^3$ comprising four characters for the respective transverse groups of switches A, B, C and D as indicated on the track diagram of Fig. 6. The route description is set up in accordance with the energization of respective wires $a$, $b$, $c$, and $d$ for these four groups, the energization of one of these wires being indicative of the designation for a track switch of the associated group A, B, C or D being required to be operated to its normal position in order to set up the route designated. Thus, with reference to Figs. 6 and 7, if the push button 1PB (see Fig. 3A) is actuated for designation of a route to track 1, selected track switches of groups A, B, and D must be operated to their normal positions, but no track switch of group C is required to be operated, because none of these track switches is included in the route under consideration. It is therefore provided, with reference to Fig. 10, that the actuation of the button on the panel $P^1$ for designation of a route to track 1 sets up a route description calling for normal controls for switches of groups A, B, and D, and if it is assumed that the storage unit $8S^2$ is not in use at this time, energy is immediately applied to the wires $a^8$, $b$ and $d$ by way of transferring the route description code from the storage $8S^3$ to the storage $8S^2$. Similarly if the storage $8S^1$ is not in use at this time, transfer of the route description is effected by the energization of corresponding control wires connecting the storage $8S^2$ with the storage $8S^1$.

Upon the setting up of the storage for the route description in the storage unit $8S^1$, energy is applied to the switch 8 to operate it to its normal position (in case it was last operated to its reverse position) in accordance with the storage $8S^1$ having had energy applied thereto by the energization of the wire $a^8$ which is associated with the control of the track switch 8W to its normal position. If, at the time of transfer of storage of the route description to the storage $8S^1$, the wire $a^8$ had not been energized, it would have been selected that the switch 8W would be operated to its reverse position.

After the switch 8W has been positioned in accordance with the route description stored by the storage unit $8S^1$, there is no further operation of the system to transfer the route description to other storage units until the entrance of the detector track section of the track switch 8W by a car for which the route description has been set up. Thus when this detector track section becomes occupied, transfer is effected from storage unit $8S^1$ to storage unit $10$—$12S^2$, or storage unit $3$—$5S^2$, dependent upon to which position the track switch 8W has been operated; thus if the track switch 8W is operated to its normal position, the transfer is made from the storage unit $8S^1$ to the storage unit 3—5S², and the storage unit 3—5S³ has its relays conditioned in accordance with the energization of the control wires b³, c⁵ and d. The energization of the wire b³ is indicative of the track switch 3W being called for in the route description to be operated to its normal position, and the energization of the wire c⁵ is indicative of the track switch 5W being required to be operated to its normal position, the lack of energization of either of these wires determines that the associated track switches will eventually be operated to their reverse positions when the route description has been transferred to the route storage unit 3—5S¹, except that the track switch 5W is not operated if it is not included in the route. The energization of the control wire d is indicative of some track switch of the group D (see Fig. 6) being required to be operated to its normal position, and the deenergized condition of this wire at time of transfer is indicative of the operation of such switch to its reverse position. It has not been chosen at this point in the operation of the system as to which of the track switches of the group D is to be operated because that selection can be made only after the track switches 3W and 5W have been operated to their required positions.

If the storage unit 3—5S¹ is not in use, the route description which has been considered as being set up in the storage unit 3—5S² is immediately transferred to the storage unit 3—5S¹. Upon this transfer (for the route to track 1), the track switch 3W is operated to its normal position, assuming the associated detector track section to be unoccupied by a car at this time. Upon the completion of operation of this track switch, it is selected by the switch repeater relay 3NWR as to which track switch is to be operated of the group D, but no transfer of route description from the storage unit 3—5S¹ is made until a car enters the detector track section for the lap switches 3W and 5W.

When a car enters the detector track section for the switches 3W and 5W, transfer is effected to storage unit 2S² or 4S² or 6S², dependent upon the positions of the respective switches 3W and 5W. For the route under consideration to track 1, the route is through the track switch 3W in its normal position, and therefore the transfer is to the storage unit 2S², and the energization of the wire d² feeding this unit is indicative of the track switch 2W being required to be operated to its normal position for the route extending to track 1. If this wire were deenergized at the time of transfer to storage unit 2S², it would be determined that the track switch 2W would be required to be operated to its reverse position.

If it is assumed that the storage unit 2S¹ is not in use, the remaining portion of the route description calling for the position of the track switch 2W is transferred from the storage unit 2S² to the storage unit 2S¹, and upon being set up in the storage unit 2S¹, the track switch 2W is power operated in accordance with the control set up, provided that the associated detector track section is unoccupied by a car.

Inasmuch as there is to be no transfer made from the storage unit 2S¹ as this storage is provided for the last track switch to be positioned for the route, cancellation of storage in the unit 2S¹ is made upon the entrance of a car into the detector track section, and thus the storage unit 2S¹ is conditioned so that there can be a transfer made to that storage unit from the storage unit 2S² for another description.

Having thus considered the general mode of operation of the system with particular reference to the setting up of a particular route, it will be readily apparent that the mode of operation which has been described is typical of the mode of operation that would be provided for the setting up of other routes through the classification yard.

Route description

For a consideration in detail of the means provided for registering route description in response to the actuation of one of the route push buttons PB (see Fig. 1) on the hump conductors panel P¹, reference is made to the circuits shown in Fig. 3A, and to the code chart of Fig. 7.

If it is assumed that the push button 1PB (see Figs. 1 and 3A), for example, is actuated for the designation of a route for the passage of a cut of cars to track 1, the push button repeater relay 1PBR is picked up in response to the actuation of this push button 1PB. The circuit by which the relay 1PBR is picked up extends from (+), including back contact 21 of relay 8TN², back contact 22 of relay PBP, pick up bus PU, contact 23 of push button 1PB in its depressed position, and upper winding of relay 1PBR, to (−). Relay 1PBR upon picking up establishes a stick circuit to maintain this relay energized subsequent to the restoration of the self-restoring push button 1PB to its normal position. This stick circuit includes a winding of the push button repeater PBP and extends from (+), including normally closed contact 24 of cancel button CNB, front contact 25 of relay 8SD³, back contact 26 of relay 8CN³, winding of relay PBP, back contacts 27, 28, 29, 30, 31, 32, 33, 34, 35, 36 and 37 of relays 12PBR, 11PBR, 10PBR, 9PBR, 8PBR, 7PBR, 6PBR, 5PBR, 4PBR, 3PBR and 2PBR, respectively, front contact 38 of relay 1PBR and lower winding of relay 1PBR, to (−). The picking up of relay PBP deenergizes the pick up bus PU for the push button repeater relays PBR by the opening of back contact 22, thus preventing the designation of a second route from acting upon the condition of the push button repeater relays PBR until the route description that has been designated is transferred to one of the other storage units.

In accordance with the picking up of the relay 1PBR, energy is applied to the respective route description control wires a³, b, c and d in accordance with the code chart of Fig. 7 for the route to track 1. If, according to the code chart, the switches of the groups A, B, C and D are to be operated to their normal positions, the associated channel control wires are respectively energized. If those switches are required to be operated to their reversed positions for setting up the route, the corresponding respective control wires have no energy applied thereto. If there are no switches at any particular one of the groups A, B, C or D included in a route, there is no energization of the corresponding channel wire.

Thus, to establish the operation of the track switches to their normal positions of the groups A, B, and D as called for according to the code chart for a route to track 1, the respective front contacts 39, 40, and 41 of the push button repeater relay 1PBR apply energy to the respective channel route description control wires a³, b and d. The wire c has no energy applied thereto as the track switch 5W (which this wire governs for the route to track 1) is not actually included in the route.

In a similar manner, the actuation of the push buttons PB for designation of a route extending to one of the other tracks is effective to apply energy to the respective four channel wires a³, b, c and d in a distinctive combination according to whether the respective track switches for that route of the groups A, B, C, and D are to be operated to their normal or reverse positions. Thus, for the setting up of a route to track 2, for example, the same switch positions are required as for setting up a route to track 1 except that the track switch 2W must be operated to its reverse rather than its normal position. Inasmuch as the track switch 2W is associated with the group D, there is no energy applied to the channel wire d, by the push button repeater relay 2PBR, and therefore the route description for a route to track 2 is provided by the energization of the wires a³, and b only through the respective front contacts 42, and 43 of the relay 2PBR.

Having described specifically typical conditions for the setting up of route descriptions in a manner to distinctively energize the respective route description control wires a³, b, c and d, consideration will now be given as to the mode of operation upon transfer of the route descriptions thus set up from the bank of relays PBR (designated as 8S³ of Fig. 10) to the second storage unit for the track switch 8W (8S² of Fig. 10).

Control for switch 8W

Upon the picking up of relay PBP when a route description is set up, the closure of its front contact 44 establishes a pick up circuit for the transfer relay 8TN², provided that the storage unit S² is available for a transfer of the route description from the storage unit S³. The deenergized condition of the relay 8SD² is indicative of the storage unit S² being available for the transfer. Thus the relay 8TN² is picked up by the energization of a circuit extending from (+), including front contact 44 of relay PBP, back contact 45 of relay 8SD², and winding of relay 8TN², to (−). The back contact 45 of relay 8SD² is shunted out of the circuit for the relay 8TN² upon the picking up of that relay by the closure of front contact 46. Relay 8TN² is also provided with an auxiliary stick circuit including front contact 47 and energized by a contact of any track designation push button PB in its actuated position so that the completion of a transfer from storage unit S³ to storage unit S² cannot be accomplished until the push button which has been actuated for designation of the route description is restored to its normal position, thus assuring that only one route description is transferred for a single actuation of a push button PB.

The transfer relay 8TN² in picking up opens the circuits applying energy for the pick up bus PU for the push button repeater relays PBR at back contact 21, and the closure of front contact 48 of relay 8TN² establishes a pick up circuit for the description storage relay 8SD² which is associated with the storage unit S², dependent upon a check being made to insure that there is no transfer being made at this time from the storage unit S² to the storage unit S¹. The circuit by which the relay 8SD² is picked up at this time extends from (+), including front contact 48 of relay 8TN², wire 49, back contact 50 of relay 8TN¹, wire 51, back contact 52 of relay CN, back contact 53 of relay 8CN², and winding of relay 8SD², to (—). The picking up of this relay opens the pick up circuit for the transfer relay 8TN² at back contact 45, and establishes a stick circuit through front contact 54 whereby the relay 8SD² is maintained picked up subsequent to the opening of front contact 48 of the relay 8TN².

The relay 8SD³ which is associated with the storage unit S³ is normally energized through back contacts 55 and 56 of relays 8SD² and 8TN², respectively; and upon the relays 8SD² and 8TN² both becoming energized as has been described, the relay 8SD³ is deenergized, but because of its slow drop away characteristics, it is maintained picked up for a sufficient length of time for the relays CS² of the storage unit S² to become conditioned in accordance with the energization of the route description channel wires $a^8$, $b$, $c$ and $d$.

For the route to track 1, for example, the relay 8ACS² is energized upon the picking up of the relay 8SD² by a circuit extending from (+), including front contact 39 of relay 1PBR, channel wire $a^8$, front contact 57 of relay 8SD³, front contact 58 of relay 8SD², front contact 59 of relay 8TN², wire 60, and upper winding of relay 8ACS², to (—). The relay 8BCS² is energized by a circuit extending from (+), including front contact 40 of relay 1PBR, wire $b$, front contact 61 of relay 8SD³, front contact 62 of relay 8SD², front contact 63 of relay 8TN², wire 64, and upper winding of relay 8BCS, to (—). The relay 8DCS² is picked up by the energization of a circuit extending from (+), including front contact 41 of relay 1PBR, channel wire $d$, front contact 65 of relay 8SD³, front contact 66 of relay 8SD², front contact 67 of relay 8TN², wire 68, and upper winding of relay 8DCS², to (—). The relays 8ACS², 8BCS² and 8DCS² when picked up, are maintained picked up through their respective stick contacts 69, 70, and 71, wire 72, and front contact 73 of relay 8SD² so that the storage of the route description by the storage unit S² is dependent upon the relay 8SD² being maintained picked up.

When the relay 8SD³ becomes dropped away because of the relays 8SD² and 8TN² being both picked up, the route description channel wires $a^8$, $b$, $c$ and $d$ are disconnected from the storage relays CS² of the storage bank S² by the opening of front contacts 57, 61, 74, and 65, respectively. The dropping away of relay 8SD³ opens the stick circuit for the relay 1PBR, which is assumed to have been energized, at front contact 25, and the relay PBP is also caused to be dropped away because of the inclusion of its winding in this stick circuit. Relay PBP in dropping away in turn causes the dropping away of the transfer relay 8TN² by the opening of its stick circuit at front contact 44, assuming the push button 1PB has been restored to its normal position. The relay 8TN² in dropping away opens the front contacts 59, 63, 75, and 67 to further isolate the channel wires $a^8$, $b$, $c$ and $d$ from the relays CS² of the storage bank S². Upon the closure of back contact 56 of the relay 8TN², the relay 8SD³ is restored to its normally energized position, but the channel wires $a^8$, $b$, $c$ and $d$ have been further isolated from the storage unit S² as has been described, and the transfer of the route description from the storage unit S³ to the storage unit S² has been completed.

If the relay 8SD¹ (see Fig. 3B) is in its deenergized position as being indicative of there being no route description stored in the storage unit 8S¹ (see Fig. 10), the transfer relay 8TN¹ is picked up upon the dropping away of the transfer relay 8TN² to initiate transfer to the storage unit 8S¹. The pick up circuit for relay 8TN¹ extends from (+), including front contact 76 of relay 8SD² (see Fig. 3A), back contact 77 of relay 8TN², wire 78, back contact 79 of relay 8SD¹, and winding of relay 8TN¹, to (—). The closure of the stick contact 80 upon the picking up of relay 8TN¹ shunts the back contact 79 of relay 8SD¹ out of the circuit just described. Relay 8TN¹ in picking up opens the stick circuit that has been described for the relay 8SD² at back contact 50, but the relay 8SD² is maintained picked up until transfer is completed to the storage unit 8S¹ by reason of an auxiliary stick circuit extending from (+), including front contact 81 of relay 8SD², wire 82, back contact 83 of relay 8SD¹, wire 51, back contacts 52 and 53 of relays CN and 8CN², respectively, and winding of relay 8SD², to (—).

Relay 8TN¹ (see Fig. 3B) in picking up closes a pick up circuit for the description storage relay 8SD¹ extending from (+), including front contact 84 of relay 8TN¹, wire 85, back contact 86 of relay 3—5TN², back contact 87 and 10—12TN², wire 88, back contact 89 of relay 8DP, normally closed contact 90 of switch control lever 8SML, back contacts 91 and 92 of cancel relays CN and 8CN¹, respectively, and winding of relay 8SD¹, to (—). The picking up of relay 8SD¹ opens the pick up circuit for the relay 8TN¹ at back contact 79, but this relay is maintained energized by its stick circuit until the dropping away of relay 8SD². Relay 8SD¹ in picking up opens the auxiliary stick circuit that has been described for the relay 8SD² at back contact 83, and thus all circuits for the energization of relay 8SD² are opened so as to cause the dropping away of that relay. Relay 8SD² is made sufficiently slow in dropping away to allow time for the transfer of controls from the relays CS² of the storage unit 8S² to the corresponding relays of the storage unit 8S¹.

Thus, for the route description for track 1, for example, the relay 8ACS¹ is picked up upon the picking up of the relay 8SD¹ by the energization of a circuit extending from (+), including front contact 93 of relay 8ACS², front contact 94 of relay 8SD¹, front contact 95 of relay 8TN¹, and upper winding of relay 8ASC¹, to (—). The relay 8BCS¹ is picked up by a circuit extending from (+), including front contact 96 of relay 8BCS², front contact 97 of relay 8SD¹, front contact 98 of relay 8TN¹, and upper winding of relay 8BCS¹, to (—). Relay 8DCS¹ is picked up by a circuit extending from (+), including front contact 99 of relay 8DCS², front contact 100 of relay 8SD¹, front contact 101 of relay 8TN¹, and upper winding of relay 8DCS¹, to (—). These storage relays when picked up, are maintained energized by obvious stick circuits through front contact 102 of relay 8SD¹ as long as the relay 8SD¹ is maintained picked up. Subsequent to the transfer of the route description from the storage unit 8S² to the storage unit 8S¹, the relay 8SD² is dropped away, and the dropping away of that relay causes the restoration of the relays CS² for the associated storage unit by the opening of front contact 73 (see Fig. 3A).

Relay 8SD² in dropping away opens the stick circuit for relay 8TN¹ at front contact 76, and the dropping away of this relay opens the pick up circuits for the relays CS¹ (see Fig. 3B) of the storage unit 8S¹ at front contacts 95, 98, 103 and 101. The closure of back contact 104 of the relay 8TN¹, with the relay 8SD¹ picked up, and the detector track section for the track switch 8W unoccupied, provides for the energization of a switch control relay 8NW or 8RW, in accordance with the position of the storage relay 8ACS¹, which is particularly associated with the control of the track switch 8W. If this relay is picked up in accordance with a route description that has been transferred to the storage unit 8S¹, the relay 8NW is picked up for operating the track switch 8W to its normal position, and if the relay 8ACS¹ is in its dropped away position at the time of closure of the switch execution circuit, the relay 8RW is picked up for the power operation of the track switch 8W to its reverse position.

Inasmuch as the relay 8ACS¹ is picked up for the route description being specifically considered for a route to track 1, the relay 8NW is energized by a circuit extending from (+), including front contact 105 of relay 8TR, contact 106 of switch control lever 8SML in its left-hand position, front contact 107 of relay 8SD$^1$, back contact 104 of relay 8TN$^1$, front contact 108 of relay 8ACS$^1$, front contact 109 of relay 8WPP, upper winding of relay 8NW, and back contact 110 of relay 8RW, to (—). The actual circuit for the power operation of the switch machine 8SM (see Fig. 6) in accordance with the selective energization of the relays 8NW and 8RW will be hereinafter considered with reference to Fig. 5.

If the relay 8ACS$^1$ were in its deenergized position in accordance with the description for a route to a track requiring the track switch 8W to be reversed, the relay 8RW would be picked up by a circuit extending from (+), including front contact 105 of relay 8TR, contact 106 of lever 8SM in its left-hand position, front contact 107 of relay 8SD$^1$, back contact 104 of relay 8TN$^1$, back contact 108 of relay 8ACS$^1$, front contact 111 of relay 8WPP, back contact 112 of relay 8NW, and upper winding of relay 8RW, to (—).

Control for switches 3W and 5W

It has been pointed out with reference to the block diagram of Fig. 10 that the respective route control channels fan out in a manner comparable to the fanning out of the track layout. That is, if the track switch 8W is actuated to its reverse position, route description is applied to the wires $b^{12}$, $c^{10}$ and $d^{7-9-11}$, while if the track switch 8W is in its normal position upon entrance of the car into its detector track section, the route description is transferred over the channel wires $b^3$, $c^5$ and $d^{2-4-6}$. This selection is made on switch repeater relays 8NWP and 8RWP in a manner to be readily apparent as the description progresses. For the purpose of considering the detailed operation involved in the typical route being considered for the passage of a car to track No. 1, it will be assumed that the description is set up as has been described in the storage unit 8S$^1$ for this route, and that the track switch 8W has been power operated to its normal position.

Upon the entrance of a car into the detector track section 8T for the track switch 8W as is illustrated according to the diagram of Fig. 8C, the track relay 8TR for that detector track section is dropped away, and the dropping away of that relay initiates the transfer of the route description (minus the control for the track switch 8W) to the storage unit 3—5S$^2$ (see Fig. 10).

With reference to Fig. 3B, the dropping away of the track relay 8TR applies energy at back contact 113 to a circuit for the energization of relay 3—5TN$^2$. This circuit extends from (+), including back contact 113 of relay 8TR, front contact 114 of relay 8SD$^1$, back contact 115 of relay 8TN$^1$, back contact 116 of relay 8TNP, back contact 117 of relay 8ACS$^1$, front contact 118 of relay 8NWP, wire 119, back contact 120 of relay 3—5SD$^2$, and winding of relay 3—5TN$^2$, to (—).

If the position of the track switch 8W were assumed to have been called for as being reverse, the relay 10—12TN$^2$ would have been picked up in preference to the relay 3—5TN$^2$ upon the entrance of a car into the detector track section for the track switch 8W. The circuit by which the relay 10—12TN$^2$ would be energized under these conditions extends from (+), including back contact 113 of relay 8TR, front contact 114 of relay 8SD$^1$, back contact 115 of relay 8TN$^1$, back contact 116 of relay 8TNP, back contact 117 of relay 8ACS$^1$, front contact 121 of relay 8RWP, wire 122, back contact 123 of relay 10—12SD$^2$, and winding of relay 10—12TN$^2$, to (—).

Also upon the dropping away of the track relay 8TR, a pick up circuit is closed for the description repeater relay 8DP (see Fig. 3B), extending from (+), including front contact 124 of relay 8SD$^1$, back contact 125 of relay 8TNP, back contact 126 of relay 8TR, and winding of relay 8DP, to (—). Relay 8DP when picked up is maintained picked up by a stick circuit closed at front contact 127 shunting back contacts 125 and 126 of relays 8TNP and 8TR out of the circuit just described. By this organization, the relay 8DP is picked up upon the entrance of a car into the associated detector track section for the track switch 8W, and is maintained picked up as long as there is a storage in the storage unit 8S$^1$, irrespective of the condition of occupancy of the associated detector track section.

Continuing with the assumption that the route being considered is the route for the passage of a car to track No. 1, the picking up of the relay 3—5TN$^2$ is effective to cause the picking up of the transfer repeater relay 8TNP by the energization of a circuit extending from (+), including front contact 128 of relay 3—5TN$^2$ (see Fig. 3C), wire 129, and winding of relay 8TNP, to (—). It will be noted that the inclusion of front contact 130 of relay 10—12TN$^2$ in multiple with the front contact 128 of relay 3—5TN$^2$ in the circuit for the relay 8TNP, provides that this relay is picked up as a repeater of either the relay 3—5TN$^2$ or the relay 10—12TN$^2$. The relay 8TNP when picked up under these conditions is maintained picked up as long as the detector track section is occupied so as to maintain the back contact 113 of relay 8TR closed, and as long as the relay 8DP is maintained picked up to close its front contact 131, energization from these sources being through the stick contact 132 of the relay 8TNP in an obvious manner.

It will be noted that the relay 8TNP, when picked up, opens the pick up circuits for the transfer relays 10—12TN$^2$ and 3—5TN$^2$, and for the relay 8DP at back contacts 116 and 125 respectively, but that the relay 8DP is maintained picked up by a stick circuit that has been described, and the relay 3—5TN$^2$ is maintained picked up until transfer has become effective by a stick circuit extending from (+), including front contact 133 of relay 8SD$^1$ (see Fig. 3B), wire 134, front contact 135 of relay 3—5TN$^2$, and winding of relay 3—5TN$^2$, to (—). Obviously if the relay 10—12TN$^2$ were picked up, it would be maintained energized by a similar stick circuit through front contact 133 of relay 8SD$^1$, and through its own front contact 136.

Upon the picking up of relay 8TNP, a circuit is conditioned whereby the relay 3—5SD$^2$ can be picked up (assuming the route to track 1), provided that the storage unit 3—5S$^2$ is not in use. The circuit by which the relay 3—5SD$^2$ is picked up under these conditions extends from (+), including front contact 137 of relay 8TNP, wire 138, front contact 139 of relay 3—5TN$^2$, back contact 140 of relay 3—5TN$^1$, back contact 141 of relay CN, and winding of relay 3—5SD$^2$, to (—). If the route under consideration were to be selected over the track switch 8W in its reversed position, the relay 3—5SD$^2$ of course would not be picked up because the front contact 139 of relay 3—5TN$^2$ would not be closed under these conditions, but the corresponding relay for the diverging routes, relay 10—SD$^2$, would be picked up by energy feeding over wire 142 (see Fig. 3B) and selected for the diverging route in a manner comparable to the selection of the circuit just described for the relay 3—5SD$^2$.

Upon the picking up of relay 3—5SD$^2$ (considering route to track 1), transfer of the route description for the portion of the route extending from the track switch 8W is effected over the channel wires $b^3$, $c^5$ and $d^{2-4-6}$. Thus, the relay 3—5BCS$^2$ becomes energized by a circuit extending from (+), including front contact 143 of relay 8BCS$^1$ (see Fig. 3B), front contact 144 of relay 8NWP, wire $b^3$, front contact 145 of relay 3—5SD$^2$, front contact 146 of relay 3—5TN$^2$, and upper winding of relay 3—5BCS$^2$, to (—).

Because of the lap switch 5 not being included in the route under consideration, the relay 8CCS$^1$ will be in its dropped away position at this time, and thus there will be no energy applied to the channel wire $c^5$, and therefore the relay 3—5CCS$^2$ will remain in its dropped away position. The relay 3—5DCS$^2$ will be picked up, however, for the route under consideration, by the energization of a circuit extending from (+), including front contact 147 of relay 8DCS$^1$, front contact 148 of relay 8NWP, wire $d^{2-4-6}$, front contact 149 of relay 3—5SD$^2$, front contact 150 of relay 3—5TN$^2$, and upper winding of relay 3—5DCS$^2$, to (—). A stick circuit is established for relay 3—5SD$^2$ including front contact 151 of relay 3—5SD$^2$, front contact 139 of relay 3—5TN$^2$, back contact 140 of relay 3—5TN$^1$ and back contact 141 of relay CN.

The picking up of relay 3—5SD$^2$ for permitting the energization of the relays of the storage unit 3—5S$^2$ also deenergizes the description storage relay 8SD$^1$ by opening the stick circuit for that relay at back contact 152, the other stick circuit for relay 8SD$^1$ being open at back contact 86 of relay 3—5TN$^2$ at this time.

The stick circuit by which the relay 8SD$^1$ has been maintained energized, subsequent to the picking up of the transfer relay 3—5TN², extends from (+), including front contact 153 of relay 8SD¹, front contact 154 of relay 8NWP, wire 155, front contact 156 of relay 3—5TN², back contact 152 of relay 3—5SD², wire 157, front contact 89 of relay 8DP, normally closed contact 90 of switch control lever 8SML, back contacts 91 and 92 of relays CN and 8CN¹, respectively and winding of relay 8SD¹, to (—). Because of the relay 8SD¹ being slow in dropping away, there is time for the relays of the storage unit 3—5S² to be conditioned before the relay 8SD¹ is dropped away to open the stick circuit for the relays of the storage bank 8S¹ at front contact 102 (see Fig. 3B) so as to permit these relays to be restored to their deenergized positions. The dropping away of the relay 8SD¹ also causes the dropping away of the relays 8DP and 3—5TN² by opening their circuits at front contacts 124 and 133, respectively. The dropping away of relay 3—5TN² opens the transfer circuits for the energization of the storage unit 3—5S² at front contacts 146, 158, and 150 respectively, but the relays 3—5BCS² and 3—5DCS² are maintained picked up by obvious stick circuits fed by front contact 159 of relay 3—5SD².

If the storage unit 3—5S¹ (see Fig. 10) is not in use for storage of a route description as is indicated by the description storage relay 3—5SD¹ (see Fig. 3C) being in its dropped away position, transfer is initiated, upon the dropping away of relay 3—5TN², by the energization of relay 3—5TN¹. Relay 3—5TN¹ is picked up under these conditions as soon as the relay 3—5TN² has been dropped away to close its back contact 160. The pick up circuit for the relay 3—5TN¹ extends from (+), including front contact 161 of relay 3—5SD², back contact 160 of relay 3—5TN², back contact 162 of relay 3—5SD¹, and winding of relay 3—5TN¹, to (—). The picking up of this relay closes a stick circuit at front contact 163 shunting the back contact 162 of relay 3—5SD¹ out of the circuit just described. It will be noted that the opening of the back contact 140 of relay 3—5TN¹ in the pick up circuit for the description storage relay 3—5SD² does not cause the dropping away of relay 3—5SD² at this time because of the energization of a stick circuit for this relay extending from (+), including front contact 164 of relay 3—5SD², back contact 165 of relay 3—5SD¹, back contact 141 of relay CN, and winding of relay 3—5SD², to (—).

Relay 3—5TN¹ when picked up closes a pick up circuit for the relay 3—5SD¹ extending from (+), including front contact 166 of relay 3—5TN¹, wire 167, back contact 168 of relay 2TN², back contact 169 of relay 4TN², back contact 170 of relay 6TN², back contact 171 of relay 3—5DP, wire 172, normally closed contact 173 of switch lever 3—5SML, back contact 174 of relay CN, and winding of relay 3—5SD¹, to (—). The picking up of relay 3—5SD¹ closes a stick circuit at front contact 175 to shunt front contact 166 of relay 3—5TN¹ out of the circuit just described.

In accordance with the picking up of the relay 3—5SD¹, the storage relay 3—5BCS¹ has its upper winding energized by a circuit including front contact 176 of relay 3—5BCS², front contact 177 of relay 3—5SD¹, and front contact 178 of relay 3—5TN¹. Inasmuch as there is no switch in the group C included for the route to track 1, the relay 3—5CCS¹ is maintained in its deenergized position, but the relay 3—5DCS¹ is picked up because of the route to track 1 requiring a normal position for the track switch 2. Thus the relay 3—5DCS¹ is energized through front contact 179 of relay 3—5DCS², front contact 180 of relay 3—5SD¹, and front contact 181 of relay 3—5TN¹. These storage relays when picked up are maintained energized by obvious stick circuits fed by front contact 182 of relay 3—5SD¹.

The picking up of relay 3—5SD¹ opens the stick circuit for the relay 3—5SD² at back contact 165 so as to cause that relay to be dropped away. Thus the slow drop away relay 3—5SD² becomes dropped away to open the stick circuits for the storage relays of the storage unit 3—5S² at front contact 159, but because of the slow drop away characteristics of the relay 3—5SD², there is time for the transfer of the route description to the storage unit 3—5S¹ as has been described.

Relay 3—5SD² in dropping away deenergizes the relay 3—5TN¹ by the opening of front contact 161, and the dropping away of the relay 3—5TN1 opens the pick up circuits for the storage relays of the storage unit 3—5S¹ at front contacts 178, 183, and 181, respectively. If it is assumed that the detector track section for the lap switches 3W and 5W is unoccupied at this time, an energization circuit is closed for the relay 3NW in accordance with the route description now stored by the storage unit 3—5S¹ so as to cause the power operation of the track switch 3W to its normal position. Relay 3NW is energized at this time by a circuit extending from (+), including front contact 184 of relay 3—5TR, contact 185 of lever 3—5SML in its left-hand position, front contact 186 of relay 3—5SD¹, back contact 187 of relay 3—5TN¹, front contact 188 of relay 3—5BCS¹, front contact 189 of relay 3—WPP, upper winding of relay 3NW, and back contact 190 of relay 3RW, to (—). It will be noted that although the relay 3—5CCS¹ is in its dropped away position in accordance with the selection of a reverse position for the track switch 5W, there is no energization of the relay 5RW because of the back contact 188 of relay 3—5BCS¹ being open. In other words this selection is in accordance with the route not including the track switch 5W, so there is no power operation of that track switch. If, however, the route stored by the storage unit 3—5S¹ had called for the track switch 3W to be in its reverse position, the closure of back contact 188 of relay 3—5BCS¹ would have conditioned a circuit whereby the relay 5NW or the relay 5RW could be energized as selected by the contact 191 of relay 3—5CCS¹ so as to provide for the power operation of the track switch 5W.

There is no further transfer of route description until such time as when the cut of cars for which the route description is stored by the unit 3—5S¹ has entered the detector track section for the track switches 3W and 5W so as to effect the dropping away of relay 3—5TR.

*Control for switch 2W*

According to the general principles of operation as they have been heretofore described, the route description transmitted beyond the storage unit 3—5S¹ (see Fig. 10) is only for governing the positioning of one remaining track switch of a route, and thus the control requires only one channel wire for each track switch that could be included in a route emanating from the location of the track switches 3W and 5W. The route description channel d² is the channel which will be most specifically considered in accordance with the specific example of operation being given for a route extending to track No. 1, and it is believed that it should be readily apparent from the typical description set forth with respect to the power operation of the track switch 2W, as to the similar circuit organization that is provided for the power actuation of the track switches 4W and 6W, which can be included in possible routes emanating from the lap switches 3W and 5W.

Upon the entrance of a car into the detector track section for the track switches 3W and 5W, as is illustrated in the track diagram according to Fig. 8F, the track relay 3—5TR for that detector track section is dropped away, and the dropping away of that relay initiates the transfer of the route description (minus the control for the prior positioned track switches) to the storage unit 2S² (see Fig. 10). The sequence of operations in response to the entrance of the car into the detector track section for the track switches 3W and 5W that will be hereinafter considered is diagrammatically illustrated in Fig. 9F.

With reference to Fig. 3C the dropping away of the track relay 3—5TR causes the picking up of the transfer relay 2TN² by the energization of a circuit extending from (+), including back contact 192 of relay 3—5TR, front contact 193 of relay 3—5SD¹, back contact 194 of relay 3—5TN¹, back contact 195 of relay 3—5TNP, front contact 196 of relay 3—5BCS¹, wire 197, front contact 198 of relay 3NWP, back contact 199 of relay 2SD², and winding of relay 2TN², to (—). If the route description would have been for a route to track 3 or track 4, the relay 4TN² would have been picked up rather than the relay 2TN² by the energization of a circuit extending from (+), including back contact 192 of relay 3—5TR (see Fig. 3C), front contact 193 of relay 3—5SD¹, back contact 194 of relay 3—5TN¹, back contact 195 of relay 3—5TNP, back contact 196 of relay 3—5BCS¹, front contact 200 of relay 3—5CCS¹, wire 201, front contact 202 of relay 3RWP, front contact 203 of relay 5NWP, back contact 204 of relay 4SD², and winding of relay 4TN², to (—). Similarly, if the route description had been for track 5 or track 6, the relay 6TN² would have been picked up rather than the relay 2TN² or 4TN² by the energization of a circuit extending from (+), including back contact 192 of relay 3—5TR (see Fig. 3C), front contact 193 of relay 3—5SD¹, back contact 194 of relay 3—5TN¹, back contact 195 of relay 3—5TNP, back contact 196 of relay 3—5BCS¹, back contact 200 of relay 3—5CCS¹, wire 205, front contact 206 of relay 3RWP, front contact 207 of relay 5RWP, back contact 208 of relay 6SD², and winding of relay 6TN², to (—).

Also upon the dropping away of the relay 3—5TR, a pick up circuit is closed for the description repeater relay 3—5DP extending from (+), including front contact 209 of relay 3—5SD¹, back contact 210 of relay 3—5TNP, back contact 211 of relay 3—5TR, wire 212, and winding of relay 3—5DP, to (—). The picking up of this relay closes a stick circuit at front contact 213 to shunt the back contacts 210 and 211 of relays 3—5TNP and 3—5TR out of the circuit just described.

Continuing with the assumption that the route being considered is the route for the passage of the car to track No. 1, the picking up of the relay 2TN² is effective to cause the picking up of the transfer repeater relay 3—5TNP. This relay is energized by an obvious circuit including front contact 214 of relay 2TN² (see Fig. 3D), and wire 215. It will be noted that the inclusion of front contacts 216 and 217 of relays 4TN² and 6TN² (see Fig. 3D) in multiple with the front contact 214 of relay 2TN² in the pick up circuit for the relay 3—5TNP, provides that the relay 3—5TNP will be picked up in response to the picking up of either of the transfer relays 2TN², 4TN² or 6TN², dependent upon the route description that has been designated. The relay 3—5TNP when picked up is maintained energized by a stick circuit including its front contact 218 and back contact 192 of relay 3—5TR connected in multiple with front contact 219 of relay 3—5DP over wire 220. It will be noted that although the picking up of the relay 3—5TNP opens the pick up circuit that has been described for the relay 2TN² at back contact 195, the relay 2TN² is maintained energized by a stick circuit including front contact 221 of relay 3—5SD¹, wire 222A, and front contact 223B of relay 2TN² until such time as the completion of transfer from the storage unit 3—5S¹ takes place.

When the relay 3—5TNP becomes picked up, a pick up circuit is closed for the description storage relay 2SD², provided there is no transfer being made from the storage unit 2S² to the storage unit 2S¹. The circuit for the energization of relay 2SD² extends from (+), including front contact 222 of relay 3—5TNP (see Fig. 3C), wire 223, front contact 224 of relay 2TN², back contact 225 of relay 2TN¹, back contact 226 of relay CN, and winding of relay 2SD², to (—). This relay is maintained energized by a stick circuit extending from (+), including front contact 227 of relay 2SD², front contact 224 of relay 2TN², back contact 225 of relay 2TN¹, back contact 226 of relay CN, and winding of relay 2SD², to (—). It will be noted that if the route being set up had been designated as extending to track 3 or track 4, that the relay 2SD² would not be picked up because the front contact 224 of the transfer relay 2TN² would not be closed, but energy would feed from front contact 222 of relay 3—5TNP (see Fig. 3C), including wire 223, and wire 228 to a control circuit for the relay 4SD² comparable to the control circuit for the relay 2SD². Similarly, if the route description had been for a route to track 5 or track 6, the energization of relay 6SD² would have been selected through front contact 222 of relay 3—5TNP, wire 223, and wire 223A, and a control circuit similar to that described for the relay 2SD², such circuit for relay 6SD² including a front contact (not shown) of the relay 6TN².

Upon the picking up of the relay 2SD², connection is made through the channel wire d² for the energization of the storage relay 2DCS² (see Fig. 3D) which constitutes the storage unit 2S² (see Fig. 10). The circuit for the energization of relay 2DCS², extends from (+), including front contact 229 of relay 3—5DCS¹, wire 230, front contact 231 of relay 3NWP, front contact 232 of relay 2SD², front contact 233 of relay 2TN², and upper winding of relay 2DCS², to (—). Relay 2DCS² when picked up is maintained picked up by an obvious stick circuit for its lower winding including front contact 234 of relay 2SD², and front contact 235 of relay 2DCS² so that this relay is maintained picked up until the description storage relay 2SD² is dropped away.

The picking up of the relay 2SD² is effective by the opening of its back contact 236 to cause the dropping away of the relay 3—5SD¹ (see Fig. 3C), this relay 3—5SD¹ having been held up in a manner comparable to that which has been fully described for the relay 8SD¹ which is associated with storage relative to the track switch 8W. Relay 3—5SD¹ in dropping away deenergizes the storage relays of storage unit 3—5S¹ by the opening of its front contact 182, and the relays 3—5DP and 2TN² are deenergized by the opening of front contacts 209 and 221 respectively.

The dropping away of relay 2TN² (see Fig. 3D), if the storage unit 2S¹ is not in use, provides for the picking up of the transfer relay 2TN¹ to initiate transfer from the storage unit 2S² to the storage unit 2S¹. The circuit by which the relay 2TN¹ is picked up under these conditions extends from (+), including front contact 237 of relay 2SD², back contact 238 of relay 2TN², back contact 239 of relay 2SD¹, and winding of relay 2TN¹, to (—). The closure of the front contact 240 of the relay 2TN² upon the picking up of that relay establishes a stick circuit to shunt back contact 239 of relay 2SD¹ out of the circuit just described.

Upon the picking up of the relay 2TN¹, a circuit is closed for the energization of relay 2SD¹ extending from (+), including front contact 241 of relay 2TN¹, front contact 242 of track relay 2TR, normally closed contact 243 of switch control lever 2SML, back contact 244 of relay CN, and winding of relay 2SD¹, to (—). With the relays 2TN¹ and 2SD¹ both picked up, a circuit is closed for the conditioning of the storage relay 2DCS¹ in accordance with the condition of energization of the storage relay 2DCS². Thus if the track switch 2W is to be operated to its normal position, the relay 2DCS¹ is picked up by the energization of a circuit extending from (+), including front contact 245 of relay 2DCS², front contact 246 of relay 2SD¹, front contact 247 of relay 2TN¹, and upper winding of relay 2DCS¹ to (—).

The picking up of relay 2SD¹ opens a stick circuit which includes front contact 248 of relay 2SD² and back contact 249 of relay 2SD¹ by which the relay 2SD² has been maintained picked up subsequent to the picking up of relay 2TN¹ to open back contact 225. Thus the relay 2SD² is dropped away, and the dropping away of that relay removes stick energy from the relay 2DCS² by the opening of front contact 234 so as to cause the relay 2DCS² to be restored to its normally deenergized position.

Relay 2SD² in dropping away also deenergizes the transfer relay 2TN¹ by the opening of front contact 237, and the dropping away of the relay 2TN¹ opens the pick up circuit for the relay 2DCS¹ at front contact 247, and at the same time closes a circuit (assuming the detector track section for track switch 2W to be unoccupied) for the relay 2NW. This circuit for the energization of relay 2NW extends from (+), including front contact 250 of track relay 2TR, contact 251 of lever 2SML in its left-hand position, front contact 252 of relay 2SD¹, back contact 253 of relay 2TN¹, front contact 254 of relay 2DCS¹, front contact 255 of relay 2WPP, upper winding of relay 2NW, and back contact 256 of relay 2RW, to (—). The picking up of the relay 2NW causes the power operation of the track switch 2W in a manner to be hereinafter considered.

If it is assumed that the car for which the description has been set up for a route to track 1, enters the detector track section of the track switch 2W as is indicated by the diagram of Fig. 8J, the track relay 2TR is dropped away, and the dropping away of this relay deenergizes the description storage relay 2SD¹ by the opening of front contact 242. Upon the dropping away of relay 2SD¹, the relay 2DP is picked up by the energization of a circuit extending from (+), including back contact 257 of relay 2SD¹, back contact 258 of relay 2TR, and winding of relay 2DP, to (—). This relay when picked up is maintained picked up by a stick circuit closed at front contact 259 which shunts back contact 257 of relay 2SD¹ out of the circuit just described. Thus, the relay 2DP is maintained picked up as long as the detector track section for the track switch 2W is occupied by the car. When the car moves out of the detector track section for the track switch 2W and the track relay 2TR is picked up, the relay 2DP is dropped away by the opening of its circuit at back contact 258.

Switch operation

Means has been described for the selective energization of the normal and reverse switch control relays NW and RW for the respective track switches in accordance with the setting up of route descriptions, and consideration is now given as to one specific means provided for governing the respective switch machines for which these normal and reverse switch control relays are respectively provided.

The motor driven switch machines are assumed to be provided according to usual practice for hump yard installations, each of the switch machines being provided with a yieldable connection which actuates upon failure of the switch machine to complete its stroke, such as may be caused by an obstruction, so as to permit the completion of the operating stroke to the extent required for the actuaion of a pole changer contact mechanism which is driven by the switch machine motor. A switch machine of this character is disclosed in the patent to C. W. Prescott No. 1,854,602, dated April 19, 1932.

With reference to Fig. 5, the switch machine 8SM for the power operation of the track switch 8W is illustrated as being governed by the respective normal and reverse switch control relays 8NW and 8RW. Assuming that the switch machine 8SM for the track switch 8W is in its normal position as shown in Fig. 5, a condition of operation will be considered wherein the relay 8RW is picked up according to a mode of operation which has been heretofore considered to cause reverse operation of the switch machine 8SM. The picking up of relay 8RW applies energy to the motor of the switch machine 8SM of a polarity to operate the switch machine 8SM to its reverse position through a circuit extending from (+), including front contact 260 of relay 8RW, contact bar 261 of the pole changing contactor of switch machine 8SM in its lower position, armature A of the motor of the switch machine 8SM, contact bar 262 of the pole changer mechanism of switch machine 8SM in its lower position, series field winding S of the motor, lower winding of relay 8RW, back contact 263 of relay 8NW, and front contact 264 of relay 8RW, to (—). Upon the completion of the power operation of the switch machine 8SM in accordance with the energization of the circuit just described, the pole changer of the switch machine is actuated, and the circuit just described is opened by the shifting of the contact bars 261 and 262 to their upper positions as shown in Fig. 5. By the inclusion of a low resistance winding of the relay 8RW in series with the circuit just described, it is provided that the relay 8RW is maintained picked up, irrespective of cancellation of a route description involving the track switch 8W, until the switch machine 8SM completes its power operation. Upon such completion, the opening of the contact bars 261 and 262 opens the series circuit including the lower winding of the relay 8RW so as to permit that relay to be dropped away if its upper winding has been deenergized by a cancellation, or transfer of a route description involving the associated track switch. It should be readily apparent from the description as set forth with respect to the operation of the track switch 8W from its normal to its reverse position, that a similar mode of operation is accomplished by the energization of the relay 8NW for the power operation of the track switch 8W from its reverse to its normal position. The energization by the relay 8NW under these conditions is through the respective front contacts 263 and 265 of this relay.

It is also provided that the shifting of the pole changer of a switch machine such as the switch machine 8SM upon completion of its operation establishes a snubbing circuit for the motor of the switch machine so as to facilitate the stopping of the rotation of the armature of the motor. To consider the circuit for the switch machine 8SM that is illustrated in Fig. 5, it has been assumed that the switch machine 8SM has been operated to its normal position, and in accordance with the completion of the operating stroke, the switch circuit controller of that switch machine has been actuated to a position with its contact bars 261 and 262 in their lower positions as shown in Fig. 5. Upon the shifting of these bars 261 and 262 to their lower positions at the end of the operating stroke, the normal switch operating circuit is opened, and a snubbing circuit is closed extending from the upper terminal of the armature A, including contact bar 261 in its lower position, lower winding of relay 8NW, back contact 266 of relay 8RW, series winding S of the motor of the switch machine 8SM, and contact bar 262 in its lower position to the lower terminal of the armature A of the motor of the switch machine 8SM. Similarly, snubbing becomes effective upon the completion of operation of the switch machine 8SM to its reverse position, the snubbing circuit under these conditions including the lower winding of the reverse switch control relay 8RW.

The respective normal and reverse switch repeater relays 8NWP and 8RWP which are associated with the track switch 8W, are assumed to be controlled by a suitable switch controller contact mechanism actuated by the switch points of the track switch 8W according to the usual practice for repeating the normal and reverse positions of a track switch that is power operated by a switch machine. The control of these relays for track switch 8W is such that a normal relay 8NWP is energized only when its associated track switch 8W is in its full normal position, and the relay 8RWP is energized only when its associated track switch 8W is in its full reverse position. Normal and reverse repeater relays NWP and RWP for other track switches are controlled in a similar manner.

The relays WPP for the respective track switches are all normally energized by respective stick circuits, dependent upon the energization of a switch correspondence relay NWP or RWP for the associated track switch. Thus, for example, the relay 8WPP (see Fig. 3B) is maintained picked up by an obvious stick circuit closed through front contacts 267 and 268 of relays 8NW and 8WPP, respectively. Front contact 269 of relay 8RWP is connected in multiple with the front contact 267 of relay 8NWP so that when the track switch 8W is in its full reverse position, the relay 8WPP has a stick circuit conditioned to maintain that relay energized.

The principal function of the relay 8WPP is to time a normal operation of its associated track switch 8W so that if longer than normal operating time is consumed before the re-establishment of the stick circuit for the relay 8WPP, this relay will have time to drop away, and upon dropping away will cause the pole changing of the control circuit for the switch machine 8SM so as to automatically restore the track switch 8W to its prior position. To consider a specific example of such type of operation, if it is assumed that operation of the track switch 8W has been initiated from its normal to its reverse position in accordance with the relay 8RW being picked up, the relay 8NWP is of course dropped away upon initial operation of the switch machine, and the opening of its front contact 267 in the stick circuit for the relay 8WPP causes the relay 8WPP to have its winding deenergized. If the switch control lever 8SML for the track switch 8W is in its left-hand position, corresponding to automatic operation, the pick up circuit for the relay 8WPP is obviously open at contact 270 of this switch control lever. If the switch control lever 8SML were to be in its center, or right-hand, operating position for manual control of the track switch 8W as will be hereinafter considered, the pick up circuit for relay 8WPP would be opened by reason of the front contacts 271 and 272 of the relays 8NWP and 8RWP both being open.

If it is assumed that the track switch 8W cannot be operated to its reverse position under the above described conditions, the relay 8RWP fails to pick up to close front contact 269 and re-establish a stick circuit for the relay 8WPP prior to this relay timing out, and thus the relay 8WPP becomes dropped away. By the dropping away of the relay 8WPP under these conditions, the shifting of contacts 109 and 111 in the circuits for the relays 8NW and 8RW respectively, opens the circuit that would have been established for the relay 8RW and connects the relay 8NW in the control circuit so as to cause the reverse relay 8RW to be dropped away and the normal relay 8NW to be picked up and thus to cause the power operation of the track switch 8W back to its former normal position. With the relay 8NW picked up and the relay 8RW in its dropped away position, energy is applied through front contacts 263 and 265 (see Fig. 5) of the relay 8NW to cause the power operation of the switch machine 8SM back to its normal position.

When the switch machine 8W has been restored to its normal position as has been described, the relay 8NWP in picking up closes front contact 267 (see Fig. 3B) so as to provide stick energy for the relay 8WPP. The closure of front contact 271 of relay 8NWP conditions a circuit by which the relay 8WPP can be picked up if the switch machine control lever 8SML is actuated to its normal position (full right-hand operated position).

Restoration of each relay WPP to its normally energized condition, after it has been dropped away for restoring a track switch to its former position, can be accomplished either automatically upon entrance of a car into the detector track section for the associated track switch, or it can be accomplished manually by the actuation of the manually operable switch control lever SML for the associated track switch from its automatic position to a normal or reverse operating position in correspondence with the last switch position that has been established. To consider specifically the manner in which this circuit organization is provided, reference is made to the circuit for the relay 8WPP (see Fig. 3B), for example, which has a pick up circuit dependent directly upon the back contact 273 of the track relay 8TR for the detector track section associated with the track switch 8W. If the operator desires to cause the restoration of the relay 8WPP prior to the entrance of the detector track section for the track switch 8W, he can accomplish this restoration by actuation of the lever 8SML to a position corresponding with the last position to which the track switch 8W has been operated. Thus, if the track switch 8W has been operated to its normal position so that the normal switch repeater relay 8NWP is picked up, the actuation of the lever 8SML to its full right-hand position is effective to establish a pick up circuit for the relay 8WPP. This circuit extends from (+), including front contact 105a of relay 8TR, contact 270 of lever 8SML in its right-hand position, front contact 271 of relay 8NWP, front contact 273 of relay 8TR, and winding of relay 8WPP, to (—). Similarly, if the associated track switch has been operated to its reverse position, the relay 8WPP can be picked up by actuation of the lever 8SML to its center position so as to close a pick up circuit extending from (+), including front contact 105a of relay 8TR, contact 270 of lever 8SML in its center position, front contact 272 of relay 8RWP, front contact 273 of relay 8TR, and winding of relay 8WPP, to (—). Relay 8WPP when picked up by the energization of either of the pick up circuits that has been described is maintained picked up dependent upon the closure of either front contact 267 of relay 8NWP or front contact 269 of relay 8RWP.

The control of the track switch 8W by manual actuation of the switch control lever 8SML is accomplished by actuation of the lever 8SML to its respetive desired normal or reverse switch operating positions.

If the track switch 8W is designated by the actuation of the lever 8SML to its reverse position, the reverse switch control relay 8RW is picked up by the energization of a circuit extending from (+), including front contact 105 of relay 8TR, contact 106 of lever 8SML in its center position, back contact 313 of relay 8RWP, front contact 111 of relay 8WPP, back contact 112 of relay 8NW, and winding of relay 8RW, to (—). The picking up of relay 8RW under these conditions causes the power operation of the track switch 8W in a manner corresponding to that which has been heretofore considered.

If it is desired that the track switch 8W be moved to its normal position in accordance with normal designation by the actuation of the lever 8SML to its reverse position (full right-hand position), the relay 8NW is picked up for causing the operation of track switch 8W to its normal position by the energization of a circuit extending from (+), including front contact 105 of relay 8TR, contact 106 of lever 8SML in its right-hand position, back contact 312 of relay 8NWP, front contact 109 of relay 8WPP, upper winding of relay 8NW, and back contact 110 of relay 8RW, to (—). Relay 8NW when picked up is effective to cause the power operation of the track switch to its normal position by a mode of operation comparable to that which has been heretofore described.

It will be noted that the relays 8NW and 8RW when energized by the actuation of the switch machine control lever 8SML to its normal or reverse control positions, are energized through the respective pole changing contacts 109 and 111 of the relay 8WPP, and thus it is provided that the mode of operation for reversal in mid-stroke, in case of the track switch failing to complete its operation, is accomplished where the normal and reverse positions for desired operation are manually designated by a mode of operation comparable to that which has been described for automatic operation. In other words, if the relay 8NW is picked up, for example, in accordance with the actuation of the lever 8SML to its normal position (extreme right position), the failure of the track switch to complete its operation causes the timing out of the relay 8WPP, and thus the dropping away of this relay is effective by the opening of front contact 109 to deenergize the relay 8NW, and upon the dropping away of relay 8NW, the relay 8RW becomes energized through back contact 109 of relay 8WPP. Restoration of the relay 8WPP after it has been dropped away under these conditions is accomplished by the same mode of operation that has been heretofore described when considering restoration while under automatic operation.

Having thus described specifically conditions relative to the power operation of the track switch 8W, it is to be understood that this detailed descripion as set forh is typical of the mode of operation provided for the power operation of the other track switches in the track layout.

*Cancellation*

According to the normal operation of the system, cancellation of the route descriptions is made automatically as has been described, but there may be conditions where there has been mismanipulation, or other reasons for making it desirable to provide manual cancellation. There may also be conditions when a car will be required to take a wrong route, because of the failure of a track switch to be able to complete its operation, and because of the track switch under these conditions being restored to its former position. Under these conditions, it is desirable that further progress of the car over a wrong route be fully in accordance with manual switch position designation, rather than being in accordance with a route description which has been carried for the associated cut of cars. It is therefore provided that the description for a cut of cars which has been required to take a wrong route must be cancelled in order to prevent the route descriptions for subsequent cars from being thrown out of correspondence with the respective cuts of cars for which they have been set up. Therefore, it is not only provided that the system will not transfer a route description for a wrong route, but it is also provided that cancellation becomes effective automatically for the route description upon passage of a cut of cars over a track switch which is in a position out of correspondence with the position called for by the route description.

To consider an example of the above described mode of operation for automatic cancellation, it will be assumed that the track switch 3W was in its reverse position for a prior route at a time when a route description was set up in the storage unit 3—5S¹ (see Fig. 10) for the control of the track switch 3W to its normal position in accordance with the establishment of a route for a cut of cars to track No. 1 as has been fully described. The route description under these conditions, has been considered as calling for the energization of the relays 3—5BCS¹ and 3—5DCS¹ (see Fig. 3C). If upon the dropping away of the relay 3—5TN¹, with the detector track section for the lap switches 3W and 5W unoccupied, the relay 3NW is picked up, the picking up of this relay is effective for causing the power operation of the track switch 3W to its normal position. If the track switch 3W were obstructed so as to be unable to be operated to its full normal position, the relay 3WPP would be dropped away according to a mode of operation which has been described when considering specifically the switch operating circuits, and upon the dropping away of the relay 3WPP, the relay 3NW would be deenergized, and the relay 3RW would be energized so as to provide for the power operation of the track switch 3W back to its former reverse position.

With the track switch 3W set in its reverse position, upon entrance of a cut of cars into the detector track section for the track switches 3W and 5W, there can be no transfer of the route description from the storage unit 3—5S¹ (see Fig. 10) to the storage unit for the next group of track switches because the energization of a transfer relay TN² (see Fig. 3D) for such group of track switches requires correspondence between switch position and switch position called for. Thus, the relay 2TN² which would be normally picked up for the route to track 1 is prevented from being energized under these conditions because its pick up circuit is open at front contact 198 of the relay 3NWP on account of the track switch 3W being in its reverse position. Although the relay 3RWP is picked up to close front contact 202 in the circuit for the relay 4TN² and front contact 206 in the circuit for the transfer relay 6TN², energy cannot feed to either of these contacts because of the back contact 196 (see Fig. 3C) of the route description relay 3—5BCS¹ being open. In other words, the relay 3—5BCS¹ is picked up in accordance with the requirement for the track switch 3W to be in its normal position for the route to track 1, and because of the failure of the track switch 3W to assume its normal position, the relay 3NWP cannot be picked up to close its front contact 198 (see Fig. 3D), and therefore there can be no transfer relay TN² picked up for the track switches of group D.

With transfer failing to take place under these conditions, there is no pick up circuit closed for the transfer repeater relay 3—5TNP (see Fig. 3C), but the description repeater relay 3—5DP (see Fig. 3D) is picked up according to the normal mode of operation as has been described. Because of failure of the relay 3—5TNP to be picked up, there is no pick up circuit closed at front contact 222 for the description storage relay 2SD² because there is no storage transferred under these conditions.

According to the normal mode of operation, the picking up of the relay 3—5DP when the detector track section for the track switches 3W and 5W becomes occupied, by the shifting of contact 171 in the circuit for the relay 3—5SD¹ (see Fig. 3C), provides that stick energy for the relay 3—5SD¹ is supplied while transfer is taking place, through a front contact 274, 275, or 276 of one of the respective relays 2TN², 4TN², or 6TN². For the abnormal condition under consideration, however, there is no transfer relay TN² picked up, and therefore the stick circuit for the relay 3—5SD¹ selected by the front contact 171 of relay 3—5DP is open. Because of the relays 2TN², 4TN², and 6TN² being all in their deenergized positions, the relay 3—5SD¹ is maintained picked up only so long as the track relay 3—5TR is in its dropped away position. The circuit by which the relay 3—5SD¹ is energized under these conditions extends from (+), including front contact 175 of relay 3—5SD¹, wire 167, back contacts 168, 169, and 170 of relays 2TN², 4TN² and 6TN², respectively, wire 277, back contact 278 of relay 3—5TR, normally closed contact 175 of the switch control lever 3—5SML, back contact 174 of relay CN, and winding of relay 3—5SD¹, to (—).

It is therefore provided that cancellation of the storage for the storage unit 3—5S¹ will become effective under the above described abnormal conditions of operation when the cut of cars for which the description was originally provided has left the detector track section for the track switches 3W and 5W so as to permit the track relay 3—5TR to be picked up. The picking up of this relay opens the stick circuit that has just been described for the relay 3—5SD¹ at back contact 278, and because of the relay 3—5DP being maintained picked up dependent upon the closure of front contact 209 of relay 3—5SD¹, the stick circuit for the relay 3—5SD¹, including back contact 171 (see Fig. 3D) of relay 3—5DP is open at this time. The stick circuit for the relay 3—5SD¹, including the front contact 171 of relay 3—5DP, is open as has been described because of there being no transfer relay 2TN², 4TN², or 6TN² picked up, as a result of the out of correspondence condition that has been set up by reason of the power operation of the track switch 3W out of correspondence with the route description called for. Upon the dropping away of the relay 3—5SD¹, the route description is cancelled by reason of opening the stick circuits for the relays 3—5BCS¹, 3—5CCS¹ and 3—5DCS¹ at front contact 159 (see Fig. 3C). The opening of front contact 209 of relay 3—5SD¹ deenergizes the description repeater relay 3—5DP to complete the cancellation of the route description. In accordance with the closure of the back contact 162 of relay 3—5SD¹ in the pick up circuit for transfer relay 3—5TN¹, the storage unit 3—5S¹ (see Fig. 10) is conditioned for the reception of the description for the next cut of cars, and transfer can be made from the storage unit 3—5S² to the storage unit 3—5S¹ according to the normal mode of operation which has been described.

It is therefore provided by the mode of operation that has been described that there is no route description transferred ahead of a track switch which fails to be operated in correspondence with the route description called for, and thus the operator of the panel P² can selectively govern the destination of the misdirected cut of cars under such conditions by his manual switch control levers so as to put the cars into a track from which they can be most readily removed for transfer to their proper track.

Another means of cancellation is provided in the form of manually operable cancellation buttons on the hump conductor's panel P¹ (see Fig. 1) in the respective upper corners of the panel. The upper right-hand cancellation button CNB is for general cancellation, and it when actuated cancels every description storage in the system by a single actuation. The left-hand button 8CNB, when actuated, is effective to cancel only the last storage that has been set up of the three storages 8S³, 8S², and 8S¹ (see Fig. 10). For a single actuation of this button, only a single route description is cancelled, but all three storages can be cancelled by three successive actuations of the button 8CNB. It will be apparent as the description progresses that the first push of the cancel button 8CNB cancels the last description storage, irrespective of whether it is stored in the storage unit 8S³, 8S², or 8S¹.

To consider specifically the mode of operation upon the actuation of the cancel button CNB to clear the entire system of storages, with reference to Fig. 3A, the actuation of this button causes the picking up of the cancel relay CN by direct energization. Relay CN in picking up opens the circuits for all description storage relays SD at back contacts 52, 91, 141, 174, 226, and 244 of relays 8SD², 8SD¹, 3—5SD¹, 2SD², and 2SD¹, respectively. With reference to Fig. 3A, the inclusion of normally closed contact 24 of the cancel button CNB in the circuit for the push button repeater relay PBP and thus in the stick circuits of the respective relays PBR, provides for cancellation of a storage that is set up by the push button repeater relays which constitutes the third storage unit associated with the track switch 8W and designated in the block diagram of Fig. 10 as the unit 8S³. It will also be readily apparent that the description storage relays SD for all of the other branches of the yard not having their circuits specifically illustrated in this embodiment of the present invention are open by contacts of the cancel relay CN when it picks up in the response to the actuation of the cancellation button CNB for clearing the entire system of route description storages. The dropping away of all of the relays SD obviously restores the storage relays for the associated storage units by opening their stick circuits in a manner comparable to that which has been described for cancellation of the respective storages when the respective relays SD have been considered as being dropped away automatically as a car progresses according to the usual automatic operation of the system.

To consider specifically the other means which has been described in general for the cancellation of route descriptions for the storage units 8S¹, 8S², and 8S³ (see Fig. 10), it will first be assumed that a description is set up as has been described for the storage unit 8S¹, and with no subsequent route descriptions having been designated. Under these conditions, the relay 8SD¹ (see Fig. 3B) is picked up, and this relay in its energized position applies stick energy to the storage relays 8ACS¹, 8BCS¹, and 8DCS¹ through front contact 102.

If it is assumed that the hump conductor desires to cancel this route description, he actuates the left-hand cancel button 8CNB on his panel P¹ (see Fig. 1), and the actuation of this button provides for the picking up of the cancel relay 8CN¹ (see Fig. 3B) which is particularly associated with the cancellation of the storage unit 8S¹ only. The circuit for the energization of the relay 8CN¹ extends from (+), including contact 279 of button 8CNB (see Fig. 3A) in its depressed position, back contact 280 of relay PBP, back contact 281 of relay 8CN³, back contact 282 of relay 8SD², back contact 283 of relay 8CN², wire 284, front contact 285 of relay 8SD¹, and winding of relay 8CN¹, to (—). This relay when picked up is maintained picked up by a stick circuit wherein front contact 286 shunts front contact 285 of relay 8SD¹ out of the circuit just described so as to maintain the cancel relay 8CN¹ picked up as long as the button 8CNB is maintained in its depressed position. It is further provided that there is positive energization of the cancellation relay 8CN¹ through its front contact 287 and through front contact 288 of relay 8SD¹ so as to maintain the cancellation relay 8CN¹ picked up until it has become effective to drop away the relay 8SD¹ in accordance with the opening of the back contact 92. Thus the storage relays of the storage unit 8S¹ can be restored by the actuation of the cancel button 8CNB.

To consider another condition of cancellation, it will be assumed that the storage units 8S¹ and 8S² both have stored descriptions and it is desirable to cancel the last description designated. This is done by the actuation of the cancel button 8CNB, and such actuation causes the picking up of the cancel relay 8CN² (see Fig. 3A) which is particularly associated with the storage unit 8S². The circuit for the energization of this relay extends from (+), including contact 279 of the cancel button 8CNB in its depressed position, back contact 280 of relay PBP, back contact 281 of relay 8CN³, front contact 289 of relay 8SD², and winding of relay 8CN², to (—). The picking up of this relay closes a stick circuit at front contact 290 to shunt front contact 289 out of the circuit just described so as to maintain the relay 8CN² picked up as long as the push button 8CNB is held in its depressed position. Another stick circuit is provided for the relay 8CN² including its front contact 291 and front contact 292 of relay 8SD² so as to provide that the relay 8CN² is maintained picked up until the dropping away of the relay 8SD² has become effective because of the opening of its circuit at back contact 53. If after cancellation has become effective as has been described for the storage unit 8S², it is also desirable to cancel the description stored by the unit 8S¹, a second actuation of the cancel button 8CNB will be effective to cause such cancellation by the energization of a circuit that has been described for the cancel relay 8CN¹.

If a condition is assumed where all three storages 8S¹, 8S², and 8S³ have respective stored descriptions, and if it is assumed that it is desirable to cancel the last description that has been designated, such cancellation can be effective by actuation of the cancel button 8CNB, which, under these conditions, causes the picking up of the cancel relay 8CN³ (see Fig. 3A) which is particularly associated with the storage unit 8S³ comprising the push button repeater relay PBR and PBP. The circuit for the energization of the cancel relay 8CN³ extends from (+), including contact 279 of the cancellation button 8CNB in its depressed position, front contact 280 of relay PBP, and winding of relay 8CN³, to (—). The picking up of this relay closes a stick circuit at front contact 293 to shunt front contact 280 of relay PBP out of the circuit just described so as to maintain the cancel relay 8CN³ picked up as long as the button 8CNB is held in its depressed position. The relay 8CN³ is also held by a stick circuit including its front contact 294 and front contact 295 of relay PBP so as to maintain the relay 8CN³ picked up until it has been effective for causing the dropping away of the push button repeater relay PBP. The relay PBP is dropped away because of the opening of back contact 26 of the relay 8CN³, and the opening of this back contact 26 also opens the stick circuit for any push button repeater relay PBR that may be maintained picked up in series with the push button repeater relay PBP. Thus the relay 8CN³ when picked up is effective to cancel the description stored by the unit 8S³. After cancellation of the route description as stored by the unit 8S³, a second actuation of the cancellation button 8CNB can be made if it is desired to cancel the description storage for the storage unit 8S², such cancellation being by a mode of operation comparable to that which has been heretofore described; and similarly a third actuation of the cancel button 8CNB under these conditions would be effective to cancel the description stored by the unit 8S¹.

It is further provided that cancellation can be made for the route description which is stored by the first storage unit S¹ for any particular track switch by the actuation of the switch control lever SML for the associated track switch on the control panel P². This means of cancellation is used particularly in case a second cut of cars catches up with the first within a particular detector track section. Such cancellation is accomplished for the storage unit 8S¹, for example, by the pulling out of the lever 8SML so as to open a contact which is included in series with the description storage relay 8SD¹ of the associated storage unit. More specifically, the pulling out of the switch control lever 8SML (see Fig. 2) is effective to deenergize the storage relay 8SD¹ (see Fig. 3B) by the opening of the normally closed contact 90 of the switch control lever 8SML. The dropping away of the relay 8SD¹ is effective by the opening of its front contact 102 to cancel the route description that has been stored by the storage unit 8S¹. Similarly for each of the other track switches, the pulling out of the associated switch control lever SML is effective to cancel the route description stored by the storage unit S¹ associated therewith. It will be readily apparent that the cancellation of such description permits the transfer of a route description from the second storage unit for the associated switch to the first storage unit, and thus after each transfer has taken place, cancellation of this route description can be made if desired by the same mode of operation that has been described. Thus, in this way, all storages for any particular track switch can be cancelled one at a time by the actuation of the switch control lever SML for the associated track switch, such lever being pulled out once for each description desired to be cancelled.

*Semi-automatic classification*

There are many conditions that may require the routing of cars other than that which can be accomplished by the automatic classification. Some of which conditions may arise because of obstructions of track switches at certain parts of the yard, car derailment, or other conditions requiring that cars be temporarily routed over a given track switch only in a given normal or reverse position. Thus, for example, it may be found that cars should temporarily be prevented from being routed to the portion of the yard selected by the operation of the track switch 8W to its reverse position, and to prevent any cars being sent over the track switch 8W in its reverse position, the operator of the panel P² (see Fig. 2) may actuate his switch control lever 8SML to its N position (extreme right). This calls for the track switch 8W to be power operated to its normal position and to be held in that position as long as the lever 8SML is maintained in its N position, irrespective of a reverse position that may be called for by a route description set up in accordance with the actuation of one of the push buttons PB on the hump conductors panel P¹ (see Fig. 1).

The relay 8NW (see Fig. 3B) is picked up for the power operation of the track switch 8W to its normal position under these conditions by the energization of a circuit extending from (+), including front contact 105 of relay 8TR, contact 106 of lever 8SML in its right-hand position, back contact 312 of relay 8NWP, front contact 109 of relay 8WPP, upper winding of relay 8NW, and back contact 110 of relay 8RW, to (—). This circuit obviously remains closed except for the times when the relay 8NW is deenergized by the dropping away of the track relay 8TR, irrespective of the switch positions called for by the respective route descriptions that are set up for the track switch 8W because the control of the track switch 8W by the route descriptions is opened by reason of the contact 106 of lever 8SML being in its right-hand position, rather than in its left-hand position. Similarly if the track switch 8W is desired to be operated to its reverse position and held in that position, such operation can be accomplished by the actuation of the lever 8SML to its center position as illustrated in Fig. 3B, and to its position R as illustrated in Fig. 2. The actuation of the lever 8SML to its center position provides a pick up circuit for the reverse relay 8RW (see Fig. 3B) extending from (+), including front contact 105 of relay 8TR, contact 106 of the lever 8SML in its center position, back contact 313 of relay 8RWP, front contact 111 of relay 8WPP, back contact 112 of relay 8NW, and upper winding of relay 8RW, to (—).

Bearing in mind the mode of operation that has been heretofore considered with respect to correspondence, in that switch position correspondence is required with the position designated by the route description as a requisite for transfer of a route description from the storage for one track switch to the storage for the next track switch to be encountered in that route. It has been pointed out that failure to establish this correspondence prevents transfer to the storage for the next track switch, and furthermore, the route description that fails to be transferred under these conditions is automatically cancelled when the detector track section for the associated track switch becomes unoccupied as a cut of cars leaves that track section. These same principles of operation with respect to automatic cancellation therefore apply when manual control is superimposed upon the system to prevent the operation of a track switch to a position called for by the route description, just as if such operation had been prevented by reason of an obstruction in the switch points. Thus, it is provided that the transfer as per usual operation in automatic classification is effective through a track switch that has been actuated by reason of the positioning of the manual switch control lever SML for that track switch when and only when the route description calls for the associated track switch to be in correspondence with the position in which it is held by the associated switch control lever SML. It is therefore provided that if an operator is required to prevent operation over a track switch in a particular position, he has to manually align routes for cars passing over this track switch only whenever the cars are required to be sent over a wrong route. It may be desirable under this condition that he manually direct the cars, because he can cause them to be sent, perhaps to the same track, where they can be most readily removed at a later date by a trimmer engine and put into their proper classifications. By this arrangement, obviously, the manual control required of the operator is maintained at a minimum in that automatic classification is still effective as long as there are possible routes for the respective cuts of cars as they pass over the track switch under consideration. Having thus considered specifically the mode of operation with respect to the manual control of the single track switch 8W, it will be readily apparent that a similar mode of operation is accomplished for the manual control of the other track switches in accordance with the positioning of their associated switch control levers SML to respective designated N and R positions as marked on the control panel P2 (see Fig. 2) as being indicative of positions to which the respective levers SML may be actuated for normal and reverse switch control.

*Indications*

Indications are provided on the hump conductor's panel P1 as to storage of route descriptions for the storages 8S1, 8S2, and 8S3 only, these storages being indicated by the lamps 8SK1, 8SK2, and 8SK3, respectively. With reference to Fig. 4A, these indicator lamps are energized directly through front contacts 296, 297 and 298 of relays 8SD1, 8SD2, and PBP, respectively, and therefore they are obviously energized to indicate storages by the respective three storage units associated with approach to the track switch 8W, which is the first track switch off of the hump.

On the panel P2 (see Fig. 2) a system of indications is provided wherein a track indicator lamp TK is provided for inclusion within the center of each of the switch control levers SML, such lamp being indicative of track occupancy of the detector track section for the associated switch or switches. Respective normal and reverse indicator lamps NK and RK are provided in the trackway of the miniature track diagram constructed on the panel P2 at positions adjoining the associated switches as is illustrated in Fig. 2 so that their respective illumination is indicative of the switch position that is used for an established route. These lamps are energized either by reason of the manipulation of the switch control lever SML for the associated switch to its respective N or R positions, or the lamps are selectively energized in accordance with the position of the associated track switch being called for automatically by the route description stored by the first storage unit for the track switch.

More specifically, the lamp 8NK (see Fig. 4A) can be energized for designating the normal position of the track switch 8W, when the switch repeater relay 8NWP is picked up and the lever 8SML is in a right-hand operated position, by the energization of a circuit extending from (+), including contact 299 of lever 8SML in a right-hand operated position, front contact 300 of relay 8TR, front contact 301 of relay 8NWP and lamp 8NK, to (−). A similar circuit would be closed for the lamp 8RK if the track switch 8W were operated to its reverse position, such circuit extending through front contact 302 of the reverse switch repeater relay 8RWP, the circuit for the lamp 8NK through front contact 301 of relay 8NWP being open at this time. If, rather than control being established by the lever 8SML in its right-hand position, the lever 8SML were operated to its left-hand position A, the circuits just described would be open at contact 299 of the switch control lever 8SML, but energy would be applied to the circuits for the indicator lamps by the front contact 303 of relay 8SD1 which is connected in multiple with contact 299 of the lever 8SML. It is thus provided that under automatic operation, whenever a routed description is stored by the first storage unit for any given track switch, the presence of the storage is indicated by the illumination of the normal or reverse indicator lamp for that track switch, thus indicating not only that a description is present for operation of that switch, but also indicating the position of the associated track switch. It will be noted from the circuit just described that the dropping away of the detector track relay 8TR upon the entrance of a cut of cars into the track section for the track switch 8W opens the circuits just described for the indicator lamps NK and RK at front contact 300 so as to cause which ever of these lamps to be extinguished that has been illuminated.

The dropping away of a detector track relay, such as the relay 8TR in the detector track section of the track switch 8W, causes the illumination of the indicator lamp contained in the switch control lever for the associated track switch, and thus for the track switch 8W, the lamp 8TK is energized upon the closure of back contact 304 of relay 8TR. This energization is taken through front contact 305 of the slow acting relay 8WPP so that the track indicator lamp 8TK is maintained energized through a front contact of the relay 8WPP to check that the relay 8WPP has been properly picked up, and is therefore in condition to provide automatic reversal of the associated track switch in case of failure of the switch to complete its operation. If the track switch fails to complete its operation, and the relay 8WPP has time to be dropped away to provide for reversal of operation as has been heretofore described, the dropping away of the relay 8WPP causes the track indicator lamp 8TK to be energized by flashing energy designated as (F+) through the back contact 305, thus providing a distinctive indication calling the attention of an operator to the abnormal condition of operation. For further calling the attention of an operator to this condition, the bell 8BX is sounded by reason of the closure of back contact 306 of relay 8WPP.

Having thus described circuits for the energization of indicator lamps belonging particularly to the track switch 8W, it is to be understood that these circuits are typical of the circuits that are provided for the indicator lamps associated with the other single track switches, and similar circuits are provided for the indicator lamps associated with the lap switches except that they may be modified as shown in Fig. 4B to combine the control of two lap switches in the energization of a single indicator lamp contained within the switch lever 3—5SML, and to provide for the control of a single warning bell which is used for indicating the failure of a track switch to complete its operation to a designated position. Thus, the indicator lamp 3—5TK for the detector track section associated with the track switches 3W and 5W is energized when the associated track relay 3—5TR is dropped away to close a circuit at back contact 307 for the lamp 3—5TK extending through front contact 308 of relay 5WPP and through front contact 309 of relay 3WPP. It will thus be seen that the failure of either of the two track switches 3W or 5W to complete its operation so as to cause the associated relay 3WPP to be dropped away, causes the steady energization of the lamp 3—5TK to be interrupted and the flashing of the lamp 3—5TK becomes effective, it being energized either through back contact 307 of relay 3WPP, or through back contact 308 of relay 5WPP. The bell 3—5BX is sounded upon the dropping away of either relay 3WPP or relay 5WPP to close back contact 310 or back contact 311.

*Passage of second car*

The mode of operation upon the passage of a second cut of cars is similar to the mode of operation that has been specifically described for the passage of a first cut of cars, except that the route description storage for the second cut of cars must be so governed as to prevent interference with the first route description, and as to prevent it being cancelled or transferred by the passage of the first cut of cars. It has been described as to how several route descriptions storages can be set up and stored simultaneously for the storage units associated with the track switch 8W, and for consideration of the passage of a second cut of cars it will be assumed that a route description has been designated for the passage of the second cut of cars to track No. 2, the route description for the first cut of cars being to track No. 1 as has been described. The sequence of relay operation for the setting up of these two routes is illustrated by the diagrams of Figs. 9A to 9M inclusive.

Under these conditions, with reference to Fig. 10, the route for the first cut of cars is stored by the storage unit 8S¹, and the route for the second cut of cars is stored by the storage unit 8S². When the first cut of cars enters the detector track section of the track switch 8W as is illustrated in the diagram of Fig. 8C, transfer of the route description storage from storage unit 8S¹ (see Fig. 10) is rendered effective, and thus this storage unit becomes available for transfer of the route description for the second cut of cars. The availability of the storage unit for transfer of the route description for the second cut of cars is manifest by the dropping away of the relay 8SD¹ (see Fig. 3B) which causes the dropping away of the storage relays 8ACS¹, 8BCS¹ and 8DCS¹ to complete the cancellation of the storage previously set up. The relay 8DP is also dropped away at this time in a manner which has been described. The closure of back contact 79 of relay 8SD¹ in the circuit for the transfer relay 8TN¹ initiates the transfer of the route description for the second cut of cars, which takes place by a mode of operation comparable to the mode of operation that has been specifically described for transfer of a route description when specifically considering the passage of a single cut of cars through the track layout.

Because of the transfer repeater relay 8TNP being in its picked up position, the transfer of the route description for the second cut of cars in accordance with the presence of the first cut of cars in the detector track section of the track switch 8W is prevented. That is, the relay 8TNP is maintained picked up as long as the detector track section of the track switch 8W remains occupied to close back contact 113 of the track relay 8TR, and with relay 8TNP picked up, the circuit feeding the transfer relays 3—5TN² and 10—12TN² is open at back contact 116 so as to prevent the initiation of transfer of the storage for the route to track 2. This is of course as it should be, because the route description for the second cut of cars must be maintained by the storage unit 8S¹ (see Fig. 10) until passage of the second cut of cars for which this route description is provided into the detector track section for the track switch 8W.

When the first cut of cars moves out of the detector track section for the track switch 8W as is illustrated in Fig. 8D, the picking up of the track relay 8TR, as is illustrated by the sequence chart of Fig. 9D, causes the picking up of the normal switch control relay 8NW in accordance with the route description set up by the storage relay 8ACS¹ (see Fig. 3B), because the route to track 2 requires the track switch 8W to be in its normal position. If it were another route that had been designated for the second cut of cars requiring the track switch 8W to be operated to its reverse position, obviously the storage relay 8ACS¹ would be in its dropped away position, and this position would select the energization of the relay 8RW for causing the power operation of the track switch 8W to its reverse position.

Having thus described the mode of operation for the control of a single track switch in accordance with a route description for the passage of a second car, it will be readily apparent that a similar mode of operation is effective for other successive cars as they are released at the hump and their route descriptions are designated by a hump conductor.

As the respective first and second cuts of cars progress through the track switch 3W in its normal position, a similar sequence of operation of the storage relays associated with the track switches 3W and 5W is rendered effective to that which has been described for the relays concerned with the track switch 8W. The sequence of operation of these relays is illustrated in Figs. 9F to 9K inclusive.

When the first cut of cars has left the detector track section for the track switch 2W and entered its track No. 1, the picking up of the track relay 2TR as is illustrated in the sequence chart of Fig. 9K is effective to cause the picking up of the relay 2RW. This is in accordance with the storage relay 2DCS¹ (see Fig. 3D) being in its deenergized position when a route description is indicated as being stored by the relay 2SD¹ being in its picked up position to close its front contact 252. Thus the track switch 2W is operated to its reverse position in accordance with the route description for passage of the second cut of cars to the track No. 2, and the entrance of the second cut of cars into the detector track section of the track switch 2W is effective to cause cancellation of the route description storage by a mode of operation comparable to that which has been heretofore specifically considered for the passage of the first cut of cars.

Having described specifically typical operating conditions for passage of respective cuts of cars through a typical classification yard, it is to be understood that the description as set forth has been primarily for the purpose of illustrating principles and modes of operation which are readily applicable to other track layouts and to the setting up of routes other than those which have been described, and it is to be understood that various modifications, adaptations and alterations may be made with respect to the specific form shown in accordance with the requirements of practice within the scope of the appending claims.

What we claim is:

1. A switch control system for the positioning of track switches in respective detector track sections in a hump classification yard having several classification tracks comprising in combination, a control panel having manually operable means disposed thereon for designation of the respective classification tracks for cuts of cars to be classified; a route description storage relay bank for each of the track switches having separate detector track sections; said storage relay banks having a relay for each of the maximum number of track switches that can be included in a route extending from the associated track switch to any classification track, circuit means for distinctively conditioning the relays of said storage relay bank for the first track switch to be passed through by a cut of cars off the hump in response to the actuation of said manually operable means to set up therein a route description storage characteristics of the switch positions required for a route extending from the hump to the classification track that has been manually designated, transfer means provided for each of said storage relay banks except the storage relay bank for the last track switch to be passed through, said transfer means being effective when rendered active to transfer the route description stored by the storage relay bank of the associated track switch for the remaining portion of the route to the storage relay bank for the next track switch in the route, transfer circuit means for rendering said transfer means active in response to the shunting of the track rails at the associated track switch, said transfer circuit means being effective to render said transfer means active in response to the shunting of the track rails for a given storage relay bank only provided that the associated track switch has been properly positioned in correspondence with the switch position called for by the route description as set up in the storage relay bank for the associated track switch, and cancellation means for each storage relay bank effective when actuated to cancel a route description stored by that storage relay bank for a particular track switch in the event that the route description stored for that track switch cannot be transferred upon the shunting of the track rails at that track switch because of lack of correspondence between the switch position called for by the storage relay bank and the actual switch position.

2. A switch control system for the positioning of track switches in respective detector track sections in a hump classification yard having several classification tracks comprising in combination, a control panel having manually operable means disposed thereon for designation of the respective classification tracks for respective cuts of cars to be classified, a route description storage relay bank for each of the track switches having separate detector track sections, said storage relay bank having a relay for each of the maximum number of track switches that can be included in a route extending to any classification track from its associated track switch, circuit means for distinctively conditioning said storage relay bank for the first track switch to be passed through from the hump in response to the actuation of said manually operable means to set up therein a route description storage in accordance with the classification track that has been designated, switch control means for effecting the power operation of each of the track switches in response to a position selected for each track switch in sequence by the associated route description storage relay bank, transfer means provided for each of said storage relay banks except for the storage relay bank for the last track switch to be passed through in a route, said transfer means being effective when rendered active to transfer the route description from the storage relay bank of the associated track switch to the storage relay bank belonging to the next track switch to be passed through upon the passage of a car over the route designated, transfer circuit means for rendering said transfer means active in response to the shunting of the track rails at the associated track switch, said transfer circuit means being rendered effective for a given storage relay bank only provided that the associated track switch has been properly positioned in correspondence with the switch position called for by the route description set up in the storage relay bank for the associated track switch, and cancellation means effective automatically to cancel a route description stored by a storage relay bank for a particular track switch that cannot be transferred upon the shunting of the track rails at the associated track switch because of lack of correspondence between the actual switch position and the switch position called for by the route description stored by the storage relay bank for the associated track switch.

3. A switch control system for the positioning of track switches in respective detector track sections between a hump and respective classification tracks in a classification yard comprising in combination, a control panel having manually operable means disposed thereon for designation of the respective classification tracks as destinations for respective cuts of cars to be classified, a route description storage relay bank for each of the track switches having separate detector track sections, said storage relay bank having a relay for each of the maximum number of track switches that can be included in a route extending from the associated track switch to any classification track, circuit means for distinctively conditioning said storage relay bank for the first track switch off of the hump in response to the actuation of said manually operable means to set up therein a route description storage in accordance with the classification track that has been designated, transfer means provided for each of said storage relay banks except for the storage relay bank for the last track switch to be passed through in a route, said transfer means being effective when rendered active to transfer the route description stored by the storage relay bank associated with that track switch for the remainder of the route to the storage relay bank associated with the next track switch to be passed through, transfer circuit means for rendering said transfer means active in response to the shunting of the track rails at the associated track switch, said transfer circuit means being rendered effective for a given storage relay bank only provided that the associated track switch has been properly positioned in correspondence with the switch position called for by the route description that has been stored by the storage relay bank for the associated track switch, and cancellation means automatically effective to cancel a route description stored by a storage bank for a particular track switch that cannot be transferred upon the shunting of the track rails at the associated track switch because of lack of correspondence at that time between the switch position and the switch position called for by the route description that has been stored, whereby a route description is automatically cancelled by a cut of cars that is required to take a route that does not conform to the route description that has been originally set up for that cut of cars.

4. A switch control system for the positioning of track switches in respective detector track sections of a classification yard having several classification tracks comprising in combination, a control panel having manually operable means disposed thereon for the designation of respective classification tracks, a route description storage relay bank for each of the track switches having separate detector track sections, said storage relay bank having a relay for each of the maximum number of track switches that can be included in a route extending to any classification track, circuit means for distinctively conditioning said storage relay bank for the first track switch to be included in a route off of the hump in response to the actuation of said manually operable means to set up therein a route description in accordance with the classification track that has been designated as the destination for a cut of cars, normal and reverse switch position repeating relays for each of the track switches effective to repeat the respective full normal and reverse operated positions of the associated track switches, switch control means for effecting the power operation of each of the track switches in response to a position selected for each track switch in sequence in a route by the associated route description storage relay bank, transfer means for each of said storage relay banks except the relay bank provided for the last track switch to be included in a route, said transfer means being effective when rendered active to transfer the route description stored by the storage relay bank for the associated track switch for the remainder of the route to the storage relay bank for the next track switch to be passed through, transfer circuit means for rendering said transfer means active in response to the shunting of the track rails at the associated track switch, said transfer circuit means being rendered effective for a given storage relay bank only provided that said normal or reverse switch position repeater relay is in correspondence with the switch position called for by the route description that is stored by the associated storage relay bank, cancellation means effective automatically to cancel a route description stored by a storage relay bank for a particular track switch that cannot be transferred upon the shunting of the track rails at that track switch because of lack of correspondence between the condition of the storage relay bank for the associated track switch and the actual position of that track switch as indicated by the condition of said switch position repeater relays, and manually operable switch control means for each of the track switches effective when actuated to govern the power operation of the associated track switch to respective designated normal or reverse positions, irrespective of the switch position called for by the route description stored in the associated storage relay bank.

5. A switch control system for the automatic positioning of track switches having respective detector track sections in a classification yard between a hump and respective classification tracks comprising in combination, a control panel having manually operable means disposed thereon for designation of the respective classification tracks as destinations for the respective cuts of cars to be classified, a route description storage relay bank for each of the track switches, said storage relay bank having a relay for governing the associated track switch and a relay for each of the maximum number of successive track switches that can be included in a route extending from the associated track switch to any classification track, circuit means for selectively conditioning said relays of said storage relay bank for the first track switch off of the hump in accordance with the classification track destination designated by said manually operable means, normal and reverse switch position repeater relays for each of the track switches repeating the full normal and full reverse positions respectively of the associated track switch, a transfer relay for each of the storage relay banks except for the storage relay bank associated with the last track switch to be passed through in a route, circuit means for energizing said transfer relay when the detector track section at the associated track switch becomes shunted only provided that said storage relay bank and said switch position indicating relays for the associated track switch are correspondingly conditioned for the normal or reverse position of the associated track switch, transfer means provided for each of said storage relay banks except for the storage relay bank associated with the last track switch to be passed through effective only in response to the energization of said transfer relay for the associated storage relay bank to transfer the route description for the remainder of the route stored by the associated storage relay bank to the storage relay bank for the next track switch to be passed through, and cancellation means for each of the storage relay banks except for the storage relay bank associated with the last track switch to be passed through in a route, effective when actuated to cancel only the route description stored by the associate storage relay bank in the event that the route description stored for that track switch cannot be transferred upon the shunting of the track rails at that track switch because of lack of correspondence between the switch position called for by the storage relay bank and the actual switch position.

6. A switch control system for the positioning of track switches in respective detector track sections in a hump classification yard having several classification tracks comprising in combination, a control panel having manually operable means disposed thereon for designation of the respective classification tracks as destinations for the respective cuts of cars to be classified, a route description storage relay bank for each of the track switches, said storage relay bank having a relay for governing the associated track switch and a relay for each of the maximum number of successive track switches that can be included in a route extending from the associated track switch to any classification track, circuit means for selectively conditioning said relays of the storage relay bank for the first track switch off of the hump in accordance with the switch position required for the associated track switch in a route designated by the actuation of said manually operable means for designation of a particular classification track, normal and reverse switch position repeater relays for each of the track switches repeating the full normal and reverse positions respectively of the associated track switch, a transfer relay for each of the storage relay banks except the storage relay bank for the last track switch to be passed through in a route, circuit means for energizing said transfer relay when the detector track section at the associated track switch becomes shunted only provided that said sotrage relay bank and said switch position indicating relays for the associated track switch are conditioned for a corresponding normal or reverse position of the associated track switch, transfer means provided for each of said storage relay banks except for the storage relay bank associated with the last track switch to be passed through effective only in response to the energization of said transfer relay for the associated storage relay bank to transfer the route description for the remainder of the route that is stored by the associated storage relay bank to the storage relay bank for the next track switch to be passed through, and cancellation means effective automatically to cancel a route description stored by a storage relay bank for a particular track switch that cannot have its route description transferred upon the shunting of the track rails because of lack of correspondence between the actual switch position and the switch position called for by the route description stored by the storage relay bank for the associated track switch.

References Cited in the file of this patent
UNITED STATES PATENTS

| | | |
|---|---|---|
| 2,194,352 | Brixner et al. | Mar. 19, 1940 |
| 2,194,353 | Brown et al. | Mar. 19, 1940 |
| 2,216,610 | Culbertson | Oct. 1, 1940 |
| 2,255,142 | Wight | Sept. 9, 1941 |
| 2,300,272 | Young | Oct. 27, 1942 |
| 2,398,588 | Miller | Apr. 16, 1946 |
| 2,425,109 | McCann | Aug. 5, 1947 |
| 2,550,859 | Pickell | May 1, 1951 |